United States Patent
Theuer (12)

(10) Patent No.: US 6,210,729 B1
(45) Date of Patent: Apr. 3, 2001

(54) GREEN COLOR OF PROCESSED VEGETABLES CONTAINING A WATER-INSOLUBLE ZINC SALT OF A FATTY ACID AND METHODS THEREFOR

(75) Inventor: Richard C. Theuer, Chesterfield, MO (US)

(73) Assignee: Beech-Nut Nutrition Corporation, St. Louis, MO (US)

(*) Notice: Subject to any disclaimer, the term of this patent is extended or adjusted under 35 U.S.C. 154(b) by 0 days.

(21) Appl. No.: 09/293,855

(22) Filed: Apr. 16, 1999

(51) Int. Cl.$^7$ .................................................... A23L 3/00

(52) U.S. Cl. ..................... 426/270; 426/96; 426/267; 426/102; 426/268; 426/262; 426/615; 426/310

(58) Field of Search ...................... 426/270, 615, 426/96, 267, 262, 102, 268, 310

(56) References Cited

U.S. PATENT DOCUMENTS

| | | | |
|---|---|---|---|
| 2,098,209 | 11/1937 | Grande | 99/193 |
| 2,589,037 | 3/1952 | Bendix et al. | 426/96 |
| 2,827,382 | 3/1958 | Malecki | 99/186 |
| 3,583,873 | 6/1971 | Barlow | 99/98 |
| 4,232,047 | 11/1980 | Sair et al. | 426/96 |
| 4,401,624 | * 8/1983 | Atwater | 422/12 |
| 4,401,700 | * 8/1983 | Weder et al. | 428/17 |
| 4,473,591 | * 9/1984 | Segner et al. | 426/270 |
| 4,478,860 | 10/1984 | Hekal et al. | 426/267 |
| 4,615,924 | 10/1986 | Hekal et al. | 428/35 |
| 4,810,512 | 3/1989 | Kratky et al. | 426/270 |
| 4,840,808 | 6/1989 | Lee et al. | 426/270 |
| 4,959,230 | 9/1990 | Wyss et al. | 426/102 |
| 5,114,725 | 5/1992 | Leake et al. | 426/270 |
| 5,407,696 | * 4/1995 | Hagiwara et al. | 426/636 |
| 5,482,727 | 1/1996 | LaBorde et al. | 426/270 |
| 5,858,447 | * 1/1999 | Kuhn | 426/654 |
| 6,004,601 | * 12/1999 | Donato et al. | 426/270 |

OTHER PUBLICATIONS

Hawley., The Condensed Chemical Dictionary, Tenth Edition., p. 450 and 947, 1981.*

Solomons., Organic Chemistry., Fourth Edition., p. 1040–1044, 1988.*

Ashbrook et al., Infants' Acceptance of Strong– and Mild–Flavored Vegetables, *J. Nutrition Ed.* 17:5, 6, 46 (1985).

Beal, On The Acceptance Of Solid Foods, And Other Food Patterns, Of Infants And Children, *Pediatrics* 20:448–456 (1957).

Decleire, Study of Green Coloration Observed Upon Sterilization of Beans Prevously Preserved in Brine, *Rev. Ferment. Ind. Aliment* 21:95–98 (1966) (English Translation Provided).

Fischbach et al., Spectrophotometric Study of the Green Color in Okra, *Assoc. Official Agricultural Chem.* 26:134–143 (1943).

Kajiura et al., Early Developmental Change in Bitter Taste Responses in Human Infants, *Developmental Psychobiol.* 25:375–386.

(List continued on next page.)

Primary Examiner—Keith Hendricks
Assistant Examiner—Philip DuBois
(74) Attorney, Agent, or Firm—Armstrong Teasdale LLP

(57) ABSTRACT

Disclosed are vegetable compositions having an improved green color comprising a processed green vegetable and at least one zinc salt of a fatty acid, wherein the salt has a low water solubility. The vegetable composition can also contain an enhancing agent which further improves the green color of the composition. Also disclosed are methods for preparing the vegetable composition and a food additive comprising the zinc salt of a fatty acid for use in preparing the vegetable composition. A vegetable composition having improved green color comprising a processed green vegetable and a water-soluble zinc salt with an enhancing agent is also disclosed.

20 Claims, 2 Drawing Sheets

EFFECT OF ADDING ZINC TO PEAS ON GREEN COLOR

OTHER PUBLICATIONS

LaBorde et al., Zinc Complex Formation in heated Vegetable Purees, *J. Agric. Food Chem.* 38:484–487 (1990).

LaBorde et al., Effect of Solutes on Zinc complex Formation in Heated Green Vegetables, *J. Agric. Food Chem.* 42:1096–1099 (1994).

Lowenberg, Development of Food Patterns in Young Children, in *Nutrition in Infancy and Childhood*, Pipes and Trahms, Eds., Mosby, St. Louis, pp. 165–180 (1993).

Rosenstein et al., Differential Facial Responses to Four Basic Tastes in Newborns, *Child Develop.* 59:1555–1568 (1988).

Schanderl et al., Color Reversion in Processed Vegetables I. Studies on Regreened Pea Purees, *J. Food Sci.* 30:312–316 (1965).

Stone and Sidel in *Sensory Evaluation Practices*, Academic Press, Orlando, pp. 58–86, 227–252 (1985).

Swirski et al., A Water–Soluble, Stable Green Pigment, Originating during Processing of Canned Brussels Sprouts Picked before the First Autumm Frosts, *J. Agr. Food Chem.* 17:799–801 (1969).

Trahms, Factors That Shape Food Patterns in Young Children, in *Nutrition in Infancy and Childhood*, Pipes and Trahms, Eds., Mosby, St. Louis, pp. 181–194 (1993).

\* cited by examiner

GREEN COLOR OF PROCESSED VEGETABLES CONTAINING A WATER-INSOLUBLE ZINC SALT OF A FATTY ACID AND METHODS THEREFOR

BACKGROUND OF THE INVENTION (1) Field of the Invention

This invention relates to food compositions containing processed green vegetables and, more particularly, to compositions and methods involving processed green vegetable compositions having an improved green color by virtue of the addition of a zinc salt to the composition. The zinc salt is, preferably, a zinc salt of a fatty acid. The processed food compositions and methods therefor are particularly applicable to canned food preparations containing processed green vegetables such as green beans and peas in semi-solid, pureed baby food preparations.

(2) Description of the Related Art

"Freshness" is a universal quality issue with prepared foods, particularly, in the commercial setting. This can be an especially important issue with canned vegetables which must undergo a heat sterilizing process to avoid any hazard to public health whether packed in glass jars, metal cans or some other hermetically sealed container. This is because this process, which preserves the comestible qualities of food and makes seasonal foods available year round, can adversely affect the color of green vegetables. As a result, canned green vegetables do not possess the bright green color of fresh vegetables, but instead have an "overcooked", grayish, olive-drab color. Indeed the greener appearance of frozen vegetables has been touted as being an indication of the freshness of the frozen vegetables compared to canned vegetables and this reflects the desirability for vegetable food preparations to possess a bright green color.

The chemical basis for the loss of the bright green color of fresh vegetables upon thermal processing, has been extensively studied. These studies have shown that chlorophyll, which is responsible for the green color in vegetables, degrades during thermal processing to compounds called pheophytins and pyropheophytins. The formation of pheophytins and pyropheophytins imparts the olive drab color to thermally processed vegetables and the formation of these substances is initiated by the release of cellular acids and the synthesis of new acids during thermal processing. As the mechanism of chlorophyll degradation became elucidated, a number of approaches were suggested for preserving the natural color of processed green vegetables (see LaBorde and von Elbe, *J. Agric. Food Chem.* 38:484–487, 1990). These approaches have included the addition of alkalizing agents in the process solutions; high temperature, short interval processing; and low temperature blanching. Whereas, these methods have been reported to retain the green color of vegetables immediately after processing, the natural green color is lost during storage.

In contrast to the olive drab color of pheophytins, certain metallo complexes of pheophytins and pyropheophytins have a green color similar to that of chlorophyll. These metallo complexes are formed when a metal such as zinc or copper replaces the magnesium of chlorophyll and upon thermal degradation of chlorophyll, zinc or copper pheophytins and pyropheophytins are formed. This results in a re-greening effect in the thermally processed vegetable in the presence of the metal and such has been observed with a number of different vegetables such as for okra in the presence of zinc ion (Fischbach and Newburger, *Assoc. Official Agricultural Chem.* 26:134–139, 1943; Fischbach and Newburger, *Assoc. Official Agricultural Chem.* 26:140–143, 1943), for peas in the presence of zinc or copper ions (Schanderl et al, *J. Food Sci* 30:312–316, 1965), for brussels sprouts in the presence of copper ions (Swirski et al., *J Agr. Food Chem.* 17:799–801, 1969) and for green beans in the presence of zinc or copper (Decleire, *Rev. Ferment. Ind. Aliment.* 21:95–98, 1966). The use of zinc or copper salts has been proposed as a possible method for improving the green color of canned green vegetables. (see for example U.S. Pat. No. 4,473,591 to Segner et al, U.S. Pat. No. 5,114,725 to Leake et al. and U.S. Patent No. 5,482,727 to LaBorde et al.). Nevertheless, these earlier reports on the re-greening effect of zinc or copper ion achieved this effect by addition of high levels of water-soluble salts of zinc or copper such as zinc chloride or copper chloride. However, the requirement for high levels of zinc or copper has prevented the application of the re-greening effect in most commercially processed green vegetable foods. This is because the FDA does not currently permit the addition of high enough amounts of these cations to vegetables when added in the form of a water-soluble salt. In particular, the addition of zinc ions is permitted only up to a level of 75 ppm, however, levels of 75 P.P.M. or less have not generally been very successful in producing a re-greening effect. Nevertheless, several reports have indicated that in some preparations, addition of zinc to achieve concentrations below 75 ppm has produced some re-greening effect. For example, Segner et al. (U.S. Pat. No. 4,473,591) reported on incorporation of levels as low as 25 ppm into beans using 190 ppm in the blanching solution, Leake et al. (U.S. Pat. No. 5,114,725) taught that zinc should be incorporated to achieve a concentration of at least 40 ppm and up to 75 ppm although no data on any re-greening effect at these levels was reported and LaBorde et al. (U.S. Pat. No. 5,482,727) reported an improvement in green color at a level of added zinc as low as 51 ppm although this patent indicates that the zinc concentrations in the optimally-colored samples exceeded the FDA limit of 75 ppm.

LaBorde and von Elbe (LaBorde and von Elbe, *J. Agric. Food Chem* 42:1096–1099, 1994) recently reported on an additional action which was predicted to enhance the zinc complex formation and re-greening effect in processed green vegetables. This group reported that the addition of sodium dodecyl sulfate, sodium caprylate or sodium oleate increased the amount of zinc pheophytin and zinc pyropheophytin complex formation produced upon chlorophyll in the presence of zinc ion. This enhancing effect was shown to occur in a pea puree preparation to which the water-soluble zinc salt, zinc chloride, was added to produce a zinc ion concentration of 300 ppm. The authors of this paper attributed the enhancing effect to a surface-active action of sodium dodecyl sulfate, sodium caprylate and sodium oleate and suggested that surface active compounds may be useful in increasing zinc complex formation in zinc-processed green vegetables.

In spite of the numerous approaches to providing an improved green color to canned vegetables, commercial production of canned green vegetables using added zinc salts to produce a greener color has not been successful because the amount of zinc required to yield a satisfactory color after processing has resulted in zinc concentrations above the FDA limit of 75 ppm (id.). Thus, there remains a continuing need to provide an effective approach for improving the green color of processed green vegetables.

BRIEF DESCRIPTION OF THE INVENTION

Accordingly, the inventor herein has succeeded in discovering that a water-insoluble zinc salt of a fatty acid produces a re-greening effect in a processed green vegetable composition at surprisingly low concentrations of total zinc of 75 ppm or less. This re-greening action is effective in a wide range of processed green vegetable compositions. Reference to processed green vegetables herein is intended to encompass green vegetables which have been treated by any method which causes a degradation of the chlorophyll in the green vegetable to form pheophytins and/or pyropheophytins. Thus, in one embodiment, the present invention is directed to a green vegetable composition comprising a processed green vegetable and at least one zinc salt of a fatty acid wherein the zinc salt of a fatty acid is insoluble in water. The zinc salt of a fatty acid is present in an amount suitable for producing a re-greening effect on the processed green vegetable composition. Total zinc concentration in the vegetable composition is preferably about 75 ppm (w/w) or less, more preferably, about 40 ppm (w/w) or less and most preferably, about 20 ppm (w/w) or less. The water-insoluble zinc salt of a fatty acid has a water solubility of, preferably, about 1% or less, still more preferably, about 0.1% or less and, most preferably, about 0.01% (w/w) or less. In preferred embodiments, the vegetable composition contains a zinc salt of a saturated fatty acid. The fatty acids that form the zinc salt of the present invention have at least 6 carbons and not more than 22 carbons. The preferred zinc salt of a fatty acid is zinc stearate.

Although the processed vegetable composition can comprise any green vegetable which contains chlorophyll, preferably the green vegetables are green beans, peas, spinach, asparagus, brussels sprouts, broccoli, okra and mixtures thereof. Most preferably the processed green vegetable comprises processed, pureed peas and green beans.

In another embodiment, the present invention is directed to a vegetable composition comprising a processed green vegetable, at least one water-insoluble zinc salt of a fatty acid and an additional agent which enhances the re-greening effect of the zinc salt. This enhancing agent can be a fatty acid, an alkali metal salt of a fatty acid or an alkaline earth metal salt of a fatty acid. Preferably, the enhancing agent is selected from the group consisting of oleic acid, palmitic acid, stearic acid, sodium stearate, calcium stearate, magnesium stearate or combinations thereof. A particularly preferred composition comprises a processed green vegetable, zinc stearate and an enhancing agent. The enhancing agent is, preferably, calcium stearate at a concentration of about 0.04% (w/w) and the zinc salt of a fatty acid is zinc stearate at a concentration of, preferably, about 0.04% (w/w) and more preferably, about 0.02% (w/w). Still more preferably, the zinc stearate is present at a concentration which results in a total zinc concentration in the vegetable composition of about 20 ppm. The vegetable can be any green vegetable, however, preferred green vegetables are green beans, peas, spinach, asparagus, brussels sprouts, broccoli, okra and mixtures thereof. Most preferably the processed green vegetable comprises processed, pureed peas.

The present invention also includes a vegetable composition prepared by a method comprising adding to a processed green vegetable, at least one water-insoluble zinc salt of a fatty acid. The zinc salt is added in an amount suitable for producing a re-greening effect on the processed green vegetable. In one aspect, this embodiment further comprises adding an effective amount of an agent that enhances the re-greening effect of the insoluble zinc salt. Preferably, the zinc salt of a fatty acid is zinc stearate, the total concentration of zinc is about 20 ppm (w/w) and the enhancing agent is calcium stearate added to the composition in an amount of about 0.04% (w/w). Preferably, the vegetable compositions can be prepared in an acceptable baby food formulation.

In another embodiment, the present invention involves a method for preparing a processed vegetable composition having an improved green color. The method comprises adding to the green vegetable, at any time before, during or after processing, at least one water-insoluble zinc salt of a fatty acid. The zinc salt is added in an amount suitable for producing a re-greening effect. Total zinc concentration in the vegetable composition is preferably about 75 ppm (w/w) or less, more preferably, about 40 ppm (w/w) and most preferably, about 20 ppm (w/w) or less. The zinc salt of a fatty acid has a water solubility of, preferably, about 1% or less, still more preferably, about 0.1% or less and, most preferably, about 0.01% (w/w) or less. In one variation of this embodiment, the zinc salt is a zinc salt of a saturated fatty acid. The fatty acids that form the zinc salt of the present invention have at least 6 carbons and not more than 22 carbons. The preferred zinc salt of a fatty acid is zinc stearate.

Although the method is applicable to any green vegetable, preferred green vegetables are green beans, peas, spinach, asparagus, brussels sprouts, broccoli, okra and mixtures thereof. Most preferably the green vegetable comprises peas and the method further comprises pureeing the peas. Processing of the green vegetable such as by thermal treatment can be performed prior to, during or after pureeing the peas and addition of the insoluble zinc salt can be at any time before during or after thermal treatment of pureeing.

In another aspect, the present invention involves a method for preparing a processed vegetable composition comprising adding to the processed green vegetable, at any time before, during or after processing, at least one water-insoluble zinc salt of a fatty acid and, further, adding an agent which enhances the re-greening effect of the zinc salt. The added enhancing agent can be a fatty acid, an alkali metal salt of a fatty acid or an alkaline earth metal salt of a fatty acid. Preferably, the enhancing agent is selected from the group consisting of oleic acid, palmitic acid, stearic acid, sodium stearate, calcium stearate, magnesium stearate or combinations thereof. The enhancing active agent is, preferably, calcium stearate added at a concentration of about 0.04% (w/w) and the zinc salt of a fatty acid is zinc stearate added at a concentration of, preferably, about 0.04% (w/w) and more preferably, about 0.02% (w/w). Still more preferably, the zinc stearate is added at a concentration which results in a total zinc concentration in the vegetable composition of about 20 ppm. The enhancing agent can also be stearic acid, preferably added at a concentration of about 0.1%, still more preferably, about 0.08% and most preferably, about 0.04%. The vegetable can be any green vegetable, however, preferred green vegetables are green beans, peas, spinach, asparagus, brussels sprouts, broccoli, okra and mixtures thereof. Most preferably the processed green vegetable comprises thermally processed, pureed peas.

In another aspect of this embodiment green vegetable composition is prepared in an acceptable baby food formulation.

In another embodiment, the present invention is directed to a food additive for use in producing a re-greening effect in thermally treated green vegetables. The food additive comprises at least one water-insoluble zinc salt of a fatty acid packaged with instructions for addition to a green vegetable composition. The green vegetable composition is processed, for example, by thermal treatment which degrades the chlorophyll into pheophytins and/or pyropheophytins and addition of the food additive produces a re-greening effect to improve the green color of the composition. Addition of the food additive can be prior to, during or after processing. The zinc salt of a fatty acid is present in the food additive in an amount suitable for convenient addition to the green vegetable preparation, for example, in an amount of about 1% (w/w) of that of the green vegetable composition. The total zinc concentration in the green vegetable composition after incorporation of the food additive is preferably about 75 ppm (w/w) or less, more preferably, about 40 ppm (w/w) or less and most preferably, about 20 ppm (w/w) or less. The water-insoluble zinc salt of a fatty acid has a water low water solubility. In preferred embodiments, the food additive comprises a zinc salt of a saturated fatty acid having at least 6 carbons and not more than 22 carbons. The most preferred zinc salt is zinc stearate.

The green vegetable composition with which the food additive is combined, can comprise any green vegetable such as, for example, green beans, peas, spinach, asparagus, brussels sprouts, broccoli, okra and mixtures thereof. Most preferably the green vegetable comprises processed, pureed peas.

In a variation of this embodiment, the present invention is directed to a food additive comprising at least one water-insoluble zinc salt of a fatty acid and an additional agent which enhances the re-greening effect of the zinc salt. This enhancing agent can be a fatty acid, an alkali metal salt of a fatty acid or an alkaline earth metal salt of a fatty acid. Preferably, the enhancing agent is selected from the group consisting of oleic acid, palmitic acid, stearic acid, sodium stearate, calcium stearate, magnesium stearate or combinations thereof. The food additive, preferably, contains calcium stearate as the enhancing agent and zinc stearate as the zinc salt of a fatty acid. The food additive is, preferably, administered in an amount that upon addition to the green vegetable composition produces a calcium stearate concentration of about 0.04% (w/w) and a zinc stearate concentration of about 0.04% (w/w) and more preferably, about 0.02% (w/w). Still more preferably, the zinc stearate concentration achieved upon addition to the green vegetable composition is about 20 ppm. The green vegetable composition can be comprised of almost any green vegetable, however, preferred green vegetables are green beans, peas, spinach, asparagus, brussels sprouts, broccoli, okra and mixtures thereof. Most preferably the processed green vegetable comprises processed, pureed peas.

In another embodiment, the present invention comprises a processed green vegetable composition, to which a water-soluble zinc salt and an enhancing agent have been added. The water-soluble zinc salt can be any zinc salt that is water-soluble such as, for example, zinc chloride, zinc sulfate, zinc nitrate, zinc acetate and the like. The enhancing agent can be a fatty acid, an alkali metal salt of a fatty acid or an alkaline earth metal salt of a fatty acid. Preferably, the enhancing agent is selected from the group consisting of palmitic acid, stearic acid, sodium stearate, calcium stearate, magnesium stearate or combinations thereof. The enhancing agent is, preferably, calcium stearate and the water-soluble zinc salt is zinc chloride. The calcium stearate is added to the green vegetable composition in an amount to produce a concentration of about 0.04% (w/w) and the zinc chloride is added to the green vegetable composition in an amount to produce a concentration of, preferably, about 0.04% (w/w) and more preferably, about 0.02% (w/w). The added zinc chloride produces a total zinc concentration in the processed green vegetable composition of 75 ppm or less, still more preferably, 40 ppm or less, and most preferably 20 ppm or less.

Among the several advantages achieved by the present invention, therefore, may be noted the provision of a new processed green vegetable composition which exhibits a natural-like green color; the provision of a processed vegetable composition exhibiting such a re-greening color due to the presence of low, nutritional levels of zinc, below 75 ppm; the provision of a composition which has an increased amount of zinc-induced re-greening due to the presence of an agent which enhances the re-greening effect of the water-insoluble zinc salt of a fatty acid; the provision of a processed baby-food composition of a processed green vegetable having a natural-like green color; the provision of methods for preparation of such compositions showing a natural-like re-greening color of a processed green vegetable; the provision of a food additive which can be used to improve the green color of processed-green vegetable, and the provision of processed green vegetables which maintain a natural green color by virtue of the presence of a water-soluble zinc salt and an enhancing agent.

DETAILED DESCRIPTION OF THE INVENTION

Figure 1:
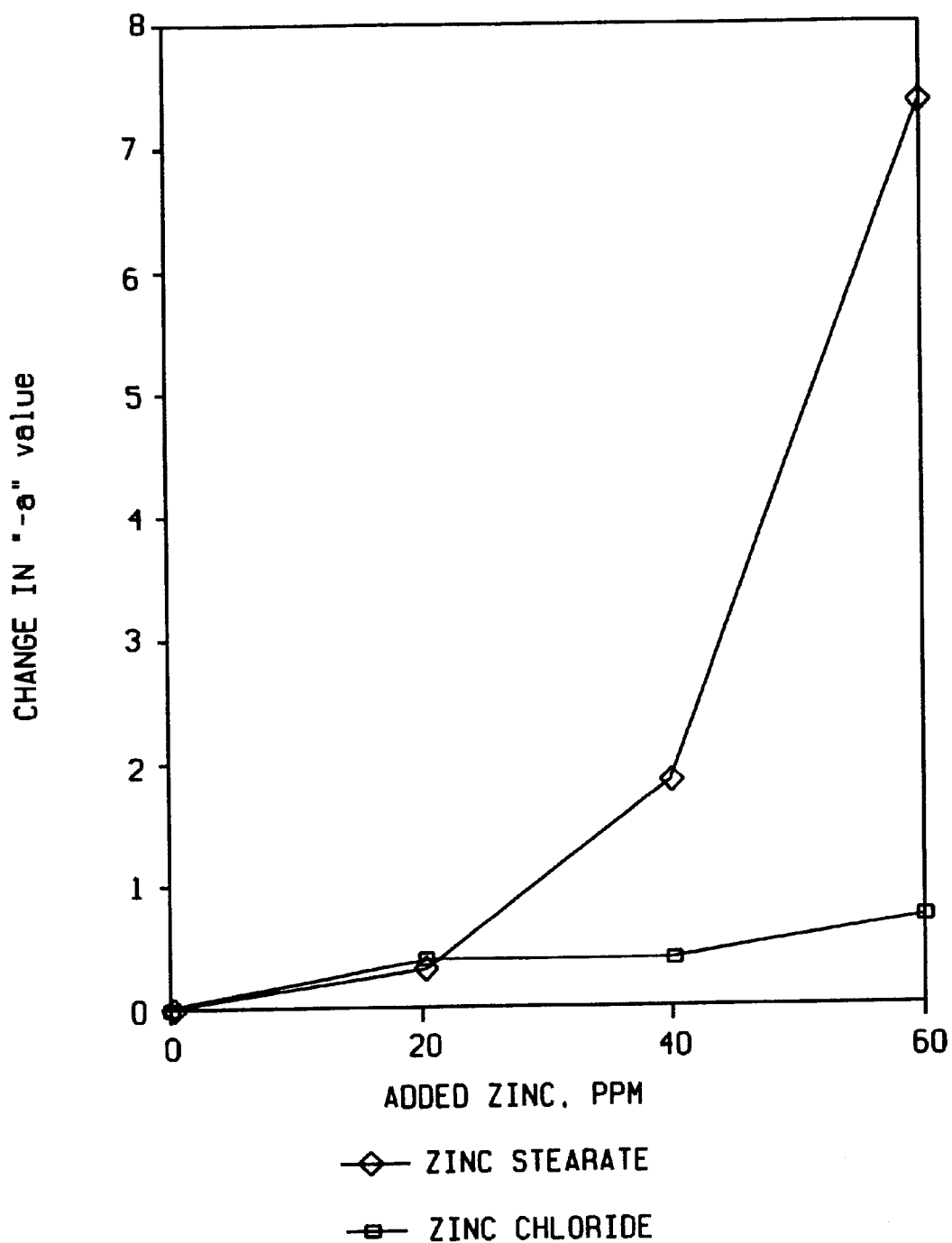
FIG. 1 illustrates the effects of zinc stearate (♦) and zinc chloride (■) on "-a" values as a measure of greenness in retorted green pea puree.

In accordance with the present invention, it has been discovered a zinc salt of a fatty acid in which the salt has a low water solubility, produces a re-greening of a processed green vegetable at surprisingly low zinc concentrations. The fatty acid component of the zinc salt can be of a chain length of, preferably from about 6 carbons to about 24 carbons or more. Preferred fatty acids have a chain length of 6 carbons or more, more preferably, 8 carbons or more, still more preferably, 12 carbons or more and most preferably, 16 or 18 carbons. The fatty acids are preferably saturated fatty acids. Thus, the preferred zinc salts of fatty acids include, with carbon chain length shown in parentheses, zinc caproate (6:0), zinc caprylate (8:0), zinc caprate (10:0), zinc laurate (12:0), zinc myristate (14:0), zinc pentadecylate (15:0), zinc palmitate (16:0), zinc stearate (18:0), zinc arachidate (20:0), zinc behenate (22:0), and zinc lignocerate (24:0). The most preferred zinc salt of a fatty acid is zinc stearate.

Also within the scope of the invention are zinc salts of monosaturated fatty acid. These include, with carbon chain length and position of unsaturated bond in parentheses, zinc caproleate (10:1n-1), zinc lauroleate (12:1n-3), zinc myristoleate (14:1n-5), zinc palmitoleate (16:1n-7), zinc palmitelaidate (16:1n-7), zinc oleate (18:1n-9), zinc elaidate (18:1n-9), zinc vaccenate (18:1n-7), zinc gadoleate (20:1n-11), zinc gondoate (20:1n-9), zinc erucate (22:1n-9) and zinc nervonate (24:1). Moreover, zinc salts of polyunsaturated fatty acids are also within the scope of the present invention including zinc linoleate (18:2n-6), zinc γ-linoleate (18:3n-6), zinc α-linolenate (18:3n-3), zinc dihomogammalinolenate (20:3n-6), zinc arachidonate (20:4n-6), zinc docosahexaenoate (22:6n-3) and the like.

The zinc salt of a fatty acid has a low water solubility. Reference herein to "low water solubility" is intended to mean the zinc salt is insoluble or slightly soluble in water, i.e. the zinc salt is no more than slightly soluble in water. All references herein to the degree of water solubility of a substance is intended to mean the water solubility at room temperature. Slightly soluble in water as used herein is intended to mean that a substance has a water solubility of about 1% or less so that a substance that has no more than slightly soluble in water is no more than about 1% solubility in water. For example, zinc caproate (6:0) has a water solubility of about 1% and as such, this substance is slightly soluble in water and has a "low water solubility". Similarly, zinc caprylate (8:0) which is no more than slightly soluble in water would be characterized as a substance having a "low water solubility" as would zinc laurate (12:0), which has a water solubility of about 0.01%. It would also be apparent to the skilled artisan that compounds that are considered to be insoluble in water are included within the concept of "low water solubility". Thus, zinc palmitate (16:0) which is also considered to be water-insoluble is included within the scope of the present invention as are other insoluble zinc salts of fatty acids.

The term "about" as used herein is intended to cover a range of values from 10% below a given value to 10% above a given value. For example, about 1% is intended to mean a range of values from 0.9% to 1.1%.

The green vegetables can be any green vegetable which contains chlorophyll including but not limited to green beans, peas, spinach, asparagus, brussels sprouts, broccoli, okra and mixtures thereof.

The green vegetable composition is a processed composition containing pheophytins and/or pyropheophytins as a result of the degradation of chlorophyll. The processing of the green vegetable can include blanching, cooking, steaming, pressure cooking, microwaving and the like. Moreover, air drying with or without heating can produce a degradation of chlorophyll with certain green vegetables such as dried green peas. A green vegetable that has been acted upon by any of the above methods or any other method which causes the formation of pheophytins and/or pyropheophytins is considered to be within of the definition of a processed green vegetable.

In another embodiment of the present invention, an enhancing agent is added which increases the re-greening effect of the zinc salt. Enhancing agents include fatty acids, alkali metal salts of fatty acids and alkaline earth metal salts of fatty acids. Such enhancing agents comprise a fatty acid component which preferably has from about 6 carbons to about 24 carbons or more. The fatty acid component of an enhancing agent has a chain length of, preferably, 6 carbons or more, more preferably, 8 carbons or more, still more preferably, 12 carbons or more and most preferably, 16 or 18 carbons or more. The fatty acid or fatty acid component of the enhancers are preferably saturated fatty acids. Thus, the preferred fatty acids, with carbon chain length shown in parentheses, caproic (6:0), caprylic (8:0), capric (10:0), lauric (12:0), myristic (14:0), pentadecylic (15:0), palmitic (16:0), stearic (18:0), arachidic (20:0), behenic (22:0), and lignoceric (24:0). The most preferred fatty acid is stearic. Other enhancers which are fatty acids or which contain fatty acid components include monosaturated fatty acids. These include, with carbon chain length and position of unsaturated bond in parentheses, caproleic (10:1n-1), lauroleic (12:1n-3), myristoleic (14:1n-5), palmitoleic (16:1n-7), palmitelaidic (16:1n-7), oleic (18:1n-9), elaidic (18:1n-9), vaccenic (18:1n-7), gadoleic (20:1n-11), gondoicic (20:1n-9), erucic (22:1n-9) and nervonic (24:1). Moreover, enhancing agents can also comprise fatty acids or contain fatty acid components which are polyunsaturated fatty acids such as linoleic (18:2n-6), linoleic (18:3n-6), α-linolenic (18:3n-3), dihomogammalinolenic (20:3n-6), arachidonic (20:4n-6), docosahexaenoic (22:6n-3) and the like.

Enhancing agents that are alkali metal salts of fatty acids include sodium, potassium and like alkali metal salts. Enhancing agents that are alkaline earth metal salts of fatty acids including calcium, magnesium and like alkaline earth metal salts of fatty acids. In addition, organic cation salts of fatty acids can be used as enhancing agents such as choline salts of fatty acids.

In another embodiment the present invention is directed to compositions and methods in which a water-soluble zinc salt is incorporated into the composition along with an enhancer. A water-soluble zinc salt, as used herein is intended to mean that the zinc salt has a solubility in water greater than about 1% (w/w), more preferable, greater than about 10% (w/w) and most preferably greater than about 20% (w/w) or more. The enhancer is a fatty acid, an alkali metal salt of a fatty acid or an alkaline earth metal salt of a fatty acid. In one particular embodiment, the enhancer can be an alkali metal salt of a fatty acid other than sodium oleate. The fatty acids and fatty acid components of the enhancing agents comprise a fatty acid component which preferably have from about 6 carbons to about 24 carbons or more. Preferred enhancing agents are saturated fatty acid and salts thereof having a chain length of, preferably, 6 carbons or more, more preferably, 8 carbons or more, still more preferably, 12 carbons or more and most preferably, 16 to 18 carbons.

The green vegetable can contain along with the green vegetable, zinc salt and, in some embodiments, an enhancing agent, such additional filler substances as corn starch, rice flour, wheat flour, nonfat dry milk and the like particularly when prepared in a baby food composition. In addition, zinc salts with or without an enhancing agent can be incorporated into a vegetable pasta product containing a green vegetable such as a vegetable macaroni product, vegetable spaghetti product, vegetable vermicelli product or the like (21 C.F.R. § 139.125 which is incorporated by reference). In addition, the green vegetable and zinc salt with or without an enhancing agent can be combined with meat, poultry, other vegetable or any other food product known in the art to be suitable for combining with a green vegetable.

The green vegetable compositions of the present invention can in some embodiments be used as a baby food. Because zinc is considered an essential nutrient for humans, the addition of zinc to a baby food in the form of a zinc salt can be beneficial to the infant. Certain epidemiological and clinical studies have suggested that some young children fail to obtain sufficient zinc from their diet and become deficient with respect to this element. Zinc deficiency in young children may cause poor appetite, poor growth, including short stature, and unusually high respiratory infections. Thus, zinc supplementation of the infant diet can be desirable. Currently zinc in the form of zinc sulfate is added to commercial jarred cereals.

The U.S. Food and Drug Administration has established a Daily Reference Value of 5 mg of zinc for infants. Given that the most popular current jar size for baby food provides 4 ounces (113 g), the zinc concentration that is particularly appropriate is 20 P.P.M. This level of 20 P.P.M. is 45% of the 5 mg Daily Reference Value (45% of 5 mg is 2.25 mg and 2.25 mg in 113 g standard jar of baby food amounts to 19.9 or about 20 mg/100 g), i.e. 20 P.P.M.) This level of 20 P.P.M. falls within the Food and Drug Administration sanctioned level of no more than 75 P.P.M of zinc in canned vegetables.

When the compositions of the present invention are to be used in a baby food the compositions are prepared in an acceptable baby-food formulation. The terms acceptable baby-food formulation are used interchangeable herein with the terms acceptable baby-food composition and acceptable baby-food preparation. An acceptable baby-food formulation is one suitable for feeding to a baby and included within the meaning of the terms acceptable baby-food formulation is any regulatory agency requirements for foods intended for consumption by infants. For example, lactic acid and malic acid have been reviewed by the Food and Drug Administration and determined not to be generally recognized as safe for use in foods for infants (see 21 C.F.R. §184.1061, §184.1069). Thus, these acids would not be incorporated into an acceptable baby-food formulation. On the other hand, the use of citric acid and phosphoric acid have been determined to be generally recognized as safe. (see 21 C.F.R. §184.1033, §182.1073). Therefore, these acids can be incorporated into an acceptable baby-food formulation. safely incorporated into the baby-food composition. In this regard, zinc is generally recognized as safe for human consumption when added to a food preparation up to a total concentration of 75 ppm. In addition, zinc stearate is generally recognized as safe for human consumption.

An acceptable baby-food formulation is also a formulation whose overall combination of organoleptic characteristics, i.e., taste, mouthfeel/texture, odor and color/appearance is of such a nature that the infant will consume and not reject the formulation and the caregiver will serve the formulation to the infant. For example, infants are known to display an aversion to bitter tastes at a very early age and to strong flavors such as can be present in some vegetables. (Trahms, in *Nutrition in Infancy and Childhood*, Pipes and Trahms, Eds, Mosby, St. Louis, 1993, pp. 181–194; Kajiura et al, *Developmental Psychobiol* 25:375–386; Rosenstein et al., *Child Develop* 59:1555–1568, 1988; Lowenberg, in *Nutrition in Infancy and Childhood*, Pipes and Trahms, Eds, Mosby, St. Louis, 1993, pp. 165–180; Brooks, supra; Lawless, supra; Ashbrook et al, *J Nutrition Ed* 17:5, 6, 46, 1985; Beal *Pediatrics* 20:448–456, 1957). Therefore, an acceptable formulation of a baby-food composition does not have a strong bitter taste or a strong flavor such as can be present in some vegetable preparations.

An acceptable baby-food formulation will also have a texture that is acceptable to the baby. For example, foods that are too dry or gritty are usually unacceptable to infants. In general, acceptable baby-food formulations will be smooth in texture. In addition, younger infants typically prefer food that is soft and homogenous. For older infants, however, a nonhomogenous texture may be desired. Because of such preferences, baby foods are typically produced in different forms, depending on the age of the intended consumer. For example, Beech-Nut Stage 1 products are intended to be consumed by infants from about three months of age. Beech-Nut Stage 2 products, which are strained and will pass through a 0.50 orifice, are intended to be consumed by infants from about six months of age. Infants of about eight or nine months of age and older are the intended consumers of Beech-Nut Stage 3 Junior products, which have chunky components that will pass through a ⅜ inch screen.

Preferably, the desired texture is achieved using the whole food concept by mixing whole food components having the desired texture. Moreover, the color and appearance of the formulation are such that the infant or the adult caregiver will not reject the formulation. Acceptable colors tend to be light rather than dark. Preferably, acceptable color is achieved using the whole food concept in which food components are added which produce the desired color for the overall mixture. The appearance of the formulation should also be smooth and homogenous.

In addition, the composition should not produce adverse side effects such as acid indigestion, diarrhea, allergic responses or the like.

Testing a baby-food composition for organoleptic acceptability can be readily performed by the skilled artisan using routine methods such as those described in the Examples below. For example, since the adult perception of bitter tastes closely follows that in the infant (Lawless, *J. Am. Diet. Assoc.* 85:577–585, 1985) and since food preferences or aversions of the adult caring for the infant are known to influence which foods are offered to the infant (Trahms, in *Nutrition in Infancy and Childhood*, Pipes and Trahms, Eds, Mosby, St. Louis, 1993, pp. 181–194; Brooks, *The Wall St J*, Dec. 4, 1996 pp A1, A6), it is possible to conduct acceptability testing in adults. Standard testing procedures for sensory evaluation are known in the art (see, for example, Stone and Sidel in *Sensory Evaluation Practices*, Academic Press, Orlando, 1985, pp 58–86, 227–252).

Testing for organoleptic acceptability in infants could be conducted, for example, after obtaining informed consent from parents in a double-blind, randomized controlled study. Infants of ages from about 4 months to about 12 months would be fed a series of baby-food compositions prepared containing, for example, a particular green vegetable composition containing a zinc stearate and calcium stearate as an enhancer. The adult feeding the infant would then record acceptability and tolerance including amount offered, amount consumed and amount refused by the babies. Acceptability rating would be performed by methodology known in the art (for example, Stone and Sidel, supra). The results would be analyzed and compositions showing acceptance comparable to or greater than that of the reference baby food would be considered organoleptically suitable for use as an infant food.

Industrial Application:

The compositions and methods of the present invention provide a appealing, natural-appearing green color to processed vegetable preparation. This improvement in the appearance of processed, and in particular, canned vegetable preparations increases the acceptability of the canned vegetable preparation which through processing would have been rendered safe but of a less desirable grayish olive drab appearance. The improvement in organoleptic quality of the green vegetable preparation is achieved through the addition of a zinc salt of a fatty acid with or without an enhancing agent or the addition of a water-soluble zinc salt with an enhancing agent and such is generally useful in the preparation of canned green vegetables. The compositions and methods of this invention are particularly applicable for use in commercial baby food preparations. In such preparations, the improved green color gives the preparation a more natural-like appearance which is more acceptable to an infant's caregiver. Moreover, the present invention also provides food additive compositions which can be manufactured for use in the commercial setting or in the home kitchen.

Preferred embodiments of the invention are described in the following examples. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the effects of zinc stearate compared to zinc chloride in retaining the green color in a retorted pea puree.

Three master batch purees were blended to create the individual mixtures. A blank master batch was made by blending 499.8 grams of thawed peas and sufficient water to achieve a batch weight of 750.6 grams of puree. A zinc stearate master batch containing 80 PPM of zinc (0.08% zinc stearate) was made by blending 333.0 grams of thawed peas, 0.4 grams of zinc stearate and sufficient water to total 500.0 grams. The zinc stearate used in this and subsequent examples is the commercially available form of zinc stearate which typically contains predominantly zinc stearate along with some zinc palmitate and zinc oxide. A zinc chloride master batch containing 80 PPM of zinc (0.17% zinc chloride) was made by blending 335.3 grams of thawed peas, 20.6 grams of zinc chloride solution containing 2 mg of zinc per gram and sufficient water to total 500.5 grams.

The three master batch purees were used to produce samples HK8Y14H through HK8Y14P, by blending as appropriate to achieve zinc levels from 0 ppm to 80 ppm, as indicated in table V below. An equal amount, 150 grams, of each of samples HK8Y14H through HK8Y14P was filled into a mason jar and heated in a microwave for 65 seconds to achieve an internal temperature greater than 80° C. to remove excessive air. All were retorted together for 60 minutes in a Presto home pressure cooker. The samples were analyzed for color using a Hunterlab Colormeter to quantitate the reflectance on an "L", "a", "b" rectangular coordinate system. The "L" coordinate is a measure of lightedness on a lightness-to-darkness continuum; the "a" axis is a measure on a continuum from green (minus) to red (plus); and the "b" axis is a measure on a continuum from blue (minus) to yellow (plus). The Hunterlab Colormeter readings are shown in Table 1 and 2.

TABLE 1

| Pea Sample | Zinc PPM | Zinc Salt | PH | L | -a | B |
|---|---|---|---|---|---|---|
| HK8Y14H | 0 | None | 6.22 | 43.44 | 2.79 | 22.99 |
| HK8Y14J | 20 | Chloride | 6.15 | 43.53 | 3.35 | 23.03 |
| HK8Y14K | 40 | Chloride | 6.10 | 43.73 | 3.99 | 23.10 |
| HK8Y14L | 80 | Chloride | 6.00 | 42.33 | 4.88 | 22.08 |
| HK8Y14M | 20 | Stearate | 6.17 | 43.92 | 4.43 | 23.29 |
| HK8Y14N | 40 | Stearate | 6.11 | 42.98 | 7.07 | 22.59 |
| HK8Y14P | 80 | Stearate | 6.08 | 41.83 | 12.15 | 22.05 |

TABLE 2

| Added zinc level (P.P.M.) | No Addition | Zinc Chloride | Zinc Stearate |
|---|---|---|---|
| | Hunter Colormeter "-a" values | | |
| 0 | 2.79 | | |
| 20 | | 3.35 | 4.43 |
| 40 | | 3.99 | 7.07 |
| 80 | | 4.88 | 12.15 |

As can be seen in Tables 1 and 2 and FIG. 1, zinc stearate, at concentrations of 20, 40 and 80 P.P.M., produced a re-greening effect in the pea puree which was microwaved and retorted in a pressure cooker. The zinc stearate was more potent in producing the re-greening effect at each concentration than was zinc chloride.

EXAMPLE 2

This example illustrates the comparative re-greening effects of zinc stearate, zinc chloride and zinc chloride in combination with sodium oleate, in a green pea puree.

Example 1 showed that zinc stearate is more effective in producing a re-greening effect than is zinc chloride in a pea puree preparation. However, zinc stearate provides both zinc and the fatty acid anion, stearate. LaBorde et al. (1994) showed that addition of the fatty acid salt, sodium oleate, enhances the re-greening effect of zinc in the form of zinc chloride. This example was designed to determine whether added zinc in the form of zinc chloride in combination with the fatty acid salt, sodium oleate, is as effective as zinc stearate in producing a re-greening effect in a pea puree.

Four master batch purees were blended to create the individual products. A blank master batch was made by blending 600.8 grams of thawed peas and sufficient water to achieve a batch weight of 900.5 grams of puree. A zinc stearate master batch containing 80 PPM of zinc and thus 0.08% fatty acid salt was made by blending 333.4 grams of thawed peas, 0.4 grams of zinc stearate and sufficient water to total 502.0 grams. A sodium oleate master batch containing 0.2% fatty acid salt was made by blending 266.5 grams of thawed peas, 0.8 grams of sodium oleate and sufficient water to total 400.6 grams. A zinc chloride master batch containing 80 PPM of zinc was made by blending 333.4 grams of thawed peas, 16.1 grams of zinc chloride solution containing 2 mg of zinc per gram and sufficient water to total 403.1 grams.

The four master batch purees were used to produce samples HK8Y19A through HK8Y19G, by blending to achieve the stated zinc and total fatty acid salt levels in the table below. An equal amount, approximately 150 grams, of each of samples HK8Y19A through HK8Y19G was filled into a mason jar and heated in a microwave for 65 seconds to achieve an internal temperature greater than 80° C. to remove excessive air. All were retorted together for 60 minutes in a Presto home pressure cooker. The samples were submitted for Hunterlab Colormeter readings, which are shown in the table below. In the table VII below, "Cl" indicates zinc added as zinc chloride, "St" indicates zinc added as stearate, and "fatty acid salt" refers to the amount of sodium oleate or zinc stearate added to the samples.

TABLE 3

| Pea Sample | Zinc PPM | Fatty acid salt % | PH | Hunterlab Colormeter readings | | |
|---|---|---|---|---|---|---|
| | | | | L | -a | B |
| HK8Y19A | 0 | 0.00% | 6.027 | 42.33 | 2.28 | 22.48 |
| HK8Y19B | 20 Cl | 0.00% | 5.977 | 40.88 | 2.38 | 21.09 |
| HK8Y19C | 40 Cl | 0.00% | 5.933 | 39.97 | 2.07 | 20.50 |
| HK8Y19D | 20 St | 0.02% | 6.018 | 42.39 | 3.79 | 22.45 |
| HK8Y19E | 20 Cl | 0.02% | 6.039 | 42.74 | 3.84 | 22.89 |
| HK8Y19F | 40 St | 0.04% | 5.971 | 40.58 | 7.01 | 21.32 |
| HK8Y19G | 40 Cl | 0.04% | 5.970 | 40.61 | 5.91 | 21.55 |

The results as shown in Table 3 above are further illustrated in Table 4.

TABLE 4

| Added Zinc Level (P.P.M.) | No Addition | Zinc Chloride | Zinc chloride + Sodium Oleate | Zinc Stearate |
|---|---|---|---|---|
| Hunterlab Colormeter "-a" | Valued | | | |
| 0 | 2.28 | | | |
| 20 | | 2.38 | 3.84 | 3.79 |
| 40 | | 2.07 | 5.91 | 7.01 |

As shown in Table 4, at level of 20 and 40 PPM added zinc, zinc stearate, zinc chloride, and zinc chloride in combination with sodium oleate all produced a retention of green resulting from a re-greening effect on the pea puree. As was reported by LaBorde et al. (1994), sodium oleate addition increased the green color retention of zinc chloride in comparison to the effect of zinc chloride alone. At the zinc level of 20 P.P.M. and a total fatty acid level of 0.02%, zinc stearate and zinc chloride in combination with sodium oleate produced virtually identical effects on green color retention. However, at 40 P.P.M. zinc and a total fatty acid level of 0.04%, zinc stearate produced a greener puree than that produced by the combination of zinc chloride and sodium oleate.

EXAMPLE 3

This example illustrates the effects of zinc stearate and zinc chloride in producing a re-greening effect in a green bean puree.

A master, 800-gram control batch of green bean puree containing no zinc was prepared by thawing frozen green beans obtained from a local grocery, placing 560 grams of the thawed green beans into a blender with 240 grams of water and blending. A second master batch containing 200 ppm zinc was prepared by combining in a blender, 350 grams of thawed green beans, 1.0 gram of zinc stearate and 150 grams of water. The mixture was blended into a puree. Samples HK8010B through HK8010G were then prepared by combining various ratios of the two master batches as indicated below.

TABLE 5

| Green Bean Sample | Zinc, as stearate | Puree with no zinc | Puree with 200 PPM zinc |
|---|---|---|---|
| HK8010B | 0 PPM | all | none |
| HK8010C | 20 PPM | 179.9 g | 19.5 g |
| HK8010D | 40 PPM | 160.2 g | 40.2 g |
| HK8010E | 60 PPM | 139.6 g | 60.4 g |
| HK8010F | 80 PPM | 120.0 g | 80.4 g |
| HK8010G | 200 PPM | none | all |

Samples HK8010H, HK8010K, HK8010L, HK8010M and HK8010N with 0 to 1000 ppm zinc as zinc chloride were prepared by pureeing thawed green beans with water or with zinc chloride solution. A zinc chloride solution containing 0.05% zinc was prepared immediately before use by dissolving 5.3 grams of anhydrous zinc chloride in 495.9 grams of water. The solution was mixed well each time before dispensing inasmuch as the solution grew cloudy after initial preparation. Samples were prepared by combining the thawed green beans, water and zinc chloride solution as follows.

TABLE 6

| Green Bean Sample | Zinc, as chloride | Thawed green beans (grams) | ZnCl Solution containing 0.05% Zn (grams) | Water (grams) |
|---|---|---|---|---|
| HK8010H | 0 PPM | 140.3 g | 0 | 62.8 |
| HK8010J | 100 PPM | 140.6 g | 4.1 g | 55.1 |
| HK8010K | 200 PPM | 140.8 g | 8.1 g | 52.1 |
| HK8010L | 300 PPM | 140.9 g | 12.0 g | 46.9 |
| HK8010M | 400 PPM | 140.2 g | 16.3 g | 44.2 |
| HK8010N | 1000 PPM | 140.7 g | 40.0 g | 21.1 |

Each of the samples were filled into a mason jar. Samples HK8010H through HK8010N were retorted together for 60 minutes in a Presto home pressure cooker. Sample pH and Hunterlab colormeter readings were then obtained. Results are shown in Table 7 and in FIG. 2.

TABLE 7

| Green Bean Sample | Zinc, PPM | pH | Hunterlab Colormeter readings | | |
|---|---|---|---|---|---|
| | | | "L" | "-a" | "b" |
| HK8010B | 0 | 5.19 | 37.87 | 0.06 | 17.50 |
| HK8010C | 20 | 5.16 | 37.25 | 4.50 | 17.25 |
| HK8010D | 40 | 5.23 | 37.32 | 9.14 | 17.53 |
| HK8010E | 60 | 5.31 | 37.12 | 10.41 | 17.43 |
| HK8010F | 80 | 5.23 | 37.76 | 11.36 | 17.73 |
| HK8010G | 200 | 5.24 | 40.18 | 12.17 | 18.98 |
| HK8010H | 0 | 5.15 | 38.08 | 0.66 | 17.63 |
| HK8010J | 100 | 5.17 | 36.44 | 6.80 | 16.92 |
| HK8010K | 200 | 5.14 | 36.90 | 8.57 | 17.33 |
| HK8010L | 300 | 5.11 | 36.93 | 9.68 | 17.30 |
| HK8010M | 400 | 5.14 | 37.81 | 10.58 | 17.64 |
| HK8010N | 1000 | 4.92 | 37.90 | 11.54 | 18.07 |

Figure 2:
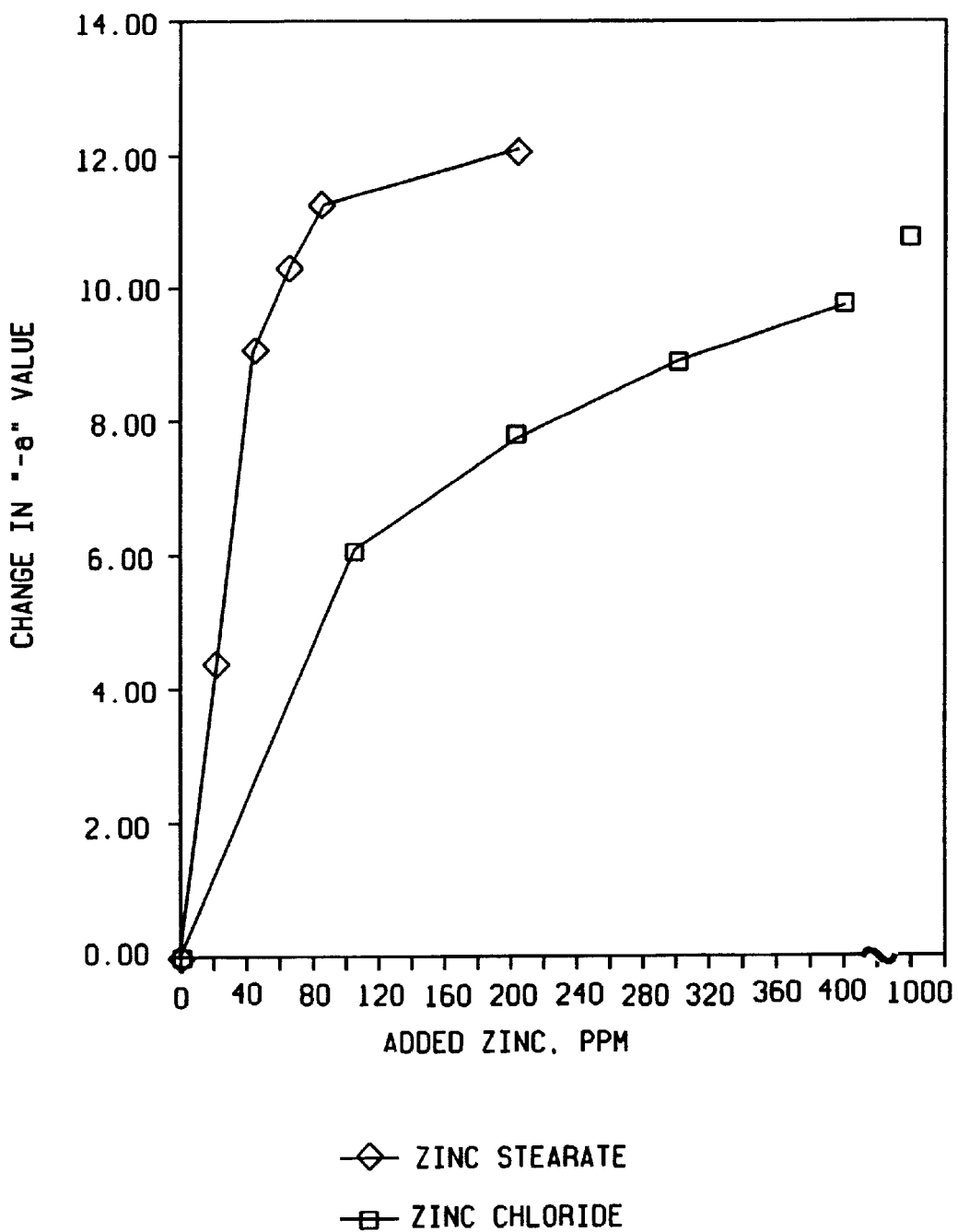
FIG. 2 illustrates the effects of zinc stearate (♦) and zinc chloride (■) on "-a" values as a measure of greenness in retorted green bean puree.

As seen in the table and FIG. 2, the higher levels of zinc from either the stearate or chloride salt produced progressively brighter green color as indicated by the increasing values for "-a" shown in the table. Surprisingly, zinc stearate generated a green color at about one-fifth the zinc concentration when the zinc was in the form of the chloride salt.

EXAMPLE 4

This example illustrates the effects of various materials in inhibiting or enhancing the re-greening effect on a green bean puree produced by zinc stearate at a zinc concentration of 20 P.P.M.

The materials tested were citric acid, monosodium glutamate ("Accent"), glycine, potassium acid tartrate ("cream of tarter") and sodium oleate. Citric acid provides citrate, a potent chelator of zinc. Potassium tartrate is a source of tartrate which, like citrate, also may complex zinc. Sodium oleate was selected because the prior art had shown a positive effect on re-greening at levels of 3%, 0.3% and 0.03% when zinc was at present at 300 PPM as the chloride. An additive concentration of 0.1% was chosen for all of the substances tested.

Two master batch purees were blended to create the individual products. A blank master batch was made by blending 579.8 grams of thawed green beans and sufficient water to achieve a batch weight of 826.4 grams of puree. A zinc stearate master batch containing 40 PPM of zinc was made by blending 524.9 grams of thawed green beans, 0.3 grams of zinc stearate and sufficient water to a total of 750.4 grams.

The two master batch purees were used to produce samples HK8Y07A through HK8Y07G. Sample HK8Y07A was the retorted blank control. Samples HK8Y07B through HK8Y07G were made by blending equal amounts of the two master batches to achieve the 20 PPM of zinc from zinc stearate and then adding 0.2 grams of each tested additive to samples HK8Y07C to HK8Y07G. An equal amount, 150 grams, of each of samples HK8Y07A through HK8Y07G was filled into a mason jar and heated in a microwave for 75 seconds to achieve an internal temperature greater than 80° C. to remove entrapped air. The samples were then retorted for 60 minutes in a Presto home pressure cooker. The Hunter Colormeter "-a" values for these samples are provided in Table 8 below.

TABLE 8

| Grn. bean Sample | Zinc PPM | Compound added, 0.1% | PH | Hunterlab Colormeter readings | | |
|---|---|---|---|---|---|---|
| | | | | L | -a | b |
| HK8Y07A | 0 | None | 5.21 | 35.27 | 0.63 | 17.97 |
| HK8Y07B | 20 | None | 5.22 | 33.19 | 4.20 | 16.52 |
| HK8Y07C | 20 | citric acid | 4.86 | 39.31 | 4.19 | 19.87 |
| HK8Y07D | 20 | sodium oleate | 5.32 | 33.67 | 9.25 | 16.94 |
| HK8Y07E | 20 | sodium glutamate | 5.24 | 32.87 | 4.48 | 16.96 |
| HK8Y07F | 20 | glycine | 5.21 | 32.84 | 4.01 | 16.94 |
| HK8Y07G | 20 | potassium acid tartrate | 5.01 | 37.24 | 4.57 | 19.30 |

LaBorde and von Elbe found that sodium oleate at levels of 0.3% and 0.03% significantly increased zinc complex formation in green bean puree containing 300 PPM of zinc as the water-soluble zinc salt, zinc chloride (La Borde et al., supra, 1994). As shown in Table 8 above, sodium oleate at 0.1% is effective in enhancing the re-greening effect of zinc at a concentration of 20 PPM added in the form of the water-insoluble zinc salt, zinc stearate, rather than zinc chloride. The lack of an enhancing effect on re-greening when citric acid was added confirms a similar finding of LaBorde and von Elbe. The other additives showed little enhancing effect on the re-greening produced by zinc stearate.

Interestingly, both citric acid and cream of tartar (potassium acid tartrate) lowered pH slightly but increased both the "L" (brightness) and "b" (blueness) readings without altering with the effect of zinc stearate on greenness ("-a").

EXAMPLE 5

This example studied the effect of sodium oleate in enhancing the zinc stearate effect on green color retention in a green pea puree.

Trial HK8Y08 was designed to investigate whether the enhancing effect of higher levels of zinc stearate is due to the greater amount of fatty acid, using sodium oleate as the source of additional fatty acid. A level of 40 P.P.M. of zinc as zinc stearate provides a zinc fatty acid salt level of 0.04%. Trial HK8Y14A–E addressed the question of whether sodium oleate alone affects the color of pea puree. Trial HKY19H–N attempted to maximize the effect of sodium oleate. These three trial were performed at the level of zinc of 20 P.P.M.

Three master batch purees were blended to prepare the samples used in this example: a blank master batch, a zinc stearate master batch containing 80 P.P.M. of zinc as 0.08% zinc stearate and a sodium oleate master batch containing 0.08% sodium oleate except for trial HK8Y19H–N, which used a master batch containing 0.2% sodium oleate. In trial HK8Y08, the blank master batch was made by blending 440.4 grams of thawed peas and sufficient water to achieve a batch weight of 660.9 grams of puree. The zinc stearate master batch containing 80 PPM of zinc and thus 0.08% fatty acid salt was made by blending 416.6 grams of thawed peas, 0.5 grams of zinc stearate and sufficient water to total 625.2 grams. The sodium oleate master batch containing 0.08% fatty acid salt was made by blending 333.6 grams of thawed peas, 0.4 grams of sodium oleate and sufficient water to total 500.0 grams. In trial HK8Y14A–E, the blank master batch was made by blending 500.7 grams of thawed peas and sufficient water to achieve a batch weight of 751.0 grams of puree. The zinc stearate master batch containing 80 PPM of zinc and thus 0.08% fatty acid salt was made by blending 333.6 grams of thawed peas, 0.4 grams of zinc stearate and sufficient water to total 500.1 grams. The sodium oleate master batch containing 0.08% fatty acid salt was made by blending 416.8 grams of thawed peas, 0.5 grams of sodium oleate and sufficient water to total 625.4 grams. In trial HK8Y19H–N, the blank master batch was made by blending 473.5 grams of thawed peas and sufficient water to achieve a batch weight of 709.6 grams of puree. The zinc stearate master batch containing 80 PPM of zinc and thus 0.08% fatty acid salt was made by blending 333.4 grams of thawed peas, 0.4 grams of zinc stearate and sufficient water to total 502.0 grams. The sodium oleate master batch containing 0.2% fatty acid salt was made by blending 266.5 grams of thawed peas, 0.8 grams of sodium oleate and sufficient water to total 400.6 grams.

In each trial, the three master batch purees were used to produce the various samples by blending appropriate amounts to achieve the stated zinc and total fatty acid salt levels for each sample as shown in the tables below. For each sample, 150 grams were filled into a mason jar and heated in a microwave for 75 seconds to achieve an internal temperature greater than 80° C. to remove excessive air. All were retorted together for 60 minutes in a Presto home pressure cooker. Samples were then submitted for pH and Hunterlab colormeter readings.

The results are summarized in the tables below. Tables 9 and 10 summarize the results of Trial HK8Y08.

TABLE 9

| Pea Sample | Zinc PPM | Fatty acid salt % | PH | Hunterlab Colormeter readings | | |
|---|---|---|---|---|---|---|
| | | | | L | -a | b |
| HK8Y08A | 0 | 0.00% | 6.27 | 42.29 | 2.65 | 22.11 |
| HK8Y08B | 20 | 0.02% | 6.21 | 42.53 | 4.62 | 22.41 |
| HK8Y08C | 20 | 0.04% | 6.22 | 42.54 | 5.93 | 22.46 |
| HK8Y08D | 20 | 0.08% | 6.20 | 40.34 | 7.31 | 20.73 |
| HK8Y08E | 40 | 0.04% | 6.12 | 40.86 | 8.07 | 21.26 |

TABLE 10

| total fatty acid salt level | no added zinc ("-a" values) | zinc, 20 PPM as the stearate ("-a" values) | zinc, 40 PPM as the stearate ("-a" values) |
|---|---|---|---|
| 0.00% | 2.65 | | |
| 0.02% | | 4.62 | |
| 0.04% | | 5.93 | 8.07 |
| 0.08% | | 7.31 | |

As is shown in Tables 9 and 10 above, sodium oleate significantly enhances the green color retention effect of zinc stearate at a low concentration of 20 P.P.M. This is particularly relevant to a composition for consumption by an infant.

Historical analyses indicate that the total amount of zinc in the pigment of re-greened vegetables is roughly equivalent to a zinc concentration in the vegetable of 15 to 20 PPM. The combination of zinc stearate as the source of zinc and an enhancing agent such as sodium oleate appears to be a uniquely efficient means of achieving green color retention in retorted green vegetable purees.

Tables 11 and 12 summarize the results of Trial HK8Y14A–G

TABLE 11

| Pea Sample | Zinc PPM | Fatty acid salt % | pH | Hunterlab Colormeter readings | | |
|---|---|---|---|---|---|---|
| | | | | L | -a | b |
| HK8Y14A | 0 | 0.00% | 5.98 | 40.90 | 2.20 | 21.50 |
| HK8Y14B | 0 | 0.02% | 6.04 | 42.71 | 2.51 | 22.60 |
| HK8Y14C | 0 | 0.04% | 6.06 | 42.56 | 2.68 | 22.84 |
| HK8Y14D | 0 | 0.08% | 6.12 | 42.44 | 3.07 | 22.74 |
| HK8Y14E | 20 | 0.02% | 5.97 | 42.09 | 4.48 | 22.54 |
| HK8Y14F | 20 | 0.04% | 6.01 | 42.10 | 5.80 | 22.59 |
| HK8Y14G | 20 | 0.08% | 6.04 | 41.77 | 8.22 | 22.32 |

TABLE 12

| total fatty acid salt level | no added zinc ("-a") | zinc, 20 PPM as the stearate ("-a") |
|---|---|---|
| 0.00% | 2.20 | |
| 0.02% | 2.51 | 4.48 |
| 0.04% | 2.68 | 5.80 |
| 0.08% | 3.07 | 8.22 |

The results in Tables 11 and 12 above show that adding sodium oleate at levels up to 0.08% in the absence of added zinc had a slight positive effect on greenness as measures in the "-a" value, but this effect was much less than the effect of adding 20 PPM of zinc as zinc stearate. On the other hand, adding sodium oleate to samples with 20 PPM of zinc stearate, to increase the total fatty acid salt level from 0.02% (no sodium oleate added) to 0.04% or 0.08%, greatly enhanced the greening effect of zinc stearate.

Tables 13 and 14 show the results of Trial HK8Y19H–N.

TABLE 13

| Pea Sample | Zinc PPM | Fatty acid salt % | PH | Hunterlab Colormeter readings | | |
|---|---|---|---|---|---|---|
| | | | | L | -a | B |
| HK8Y19H | 0 | 0.00% | 6.047 | 39.83 | 1.94 | 20.77 |
| HK8Y19J | 20 | 0.02% | 6.039 | 41.70 | 4.14 | 22.09 |
| HK8Y19K | 20 | 0.04% | 6.085 | 40.85 | 4.61 | 21.44 |
| HK8Y19L | 20 | 0.08% | 6.058 | 40.30 | 6.41 | 21.14 |
| HK8Y19M | 20 | 0.12% | 6.095 | 41.58 | 9.64 | 22.04 |
| HK8Y19N | 20 | 0.155% | 6.158 | 41.75 | 11.02 | 22.13 |

TABLE 14

| total fatty acid salt level | no added zinc ("-a") | zinc, 20 PPM as the stearate ("-a") |
|---|---|---|
| 0.00% | 1.94 | |
| 0.02% | | 4.14 |
| 0.04% | | 4.61 |
| 0.08% | | 6.41 |
| 0.12% | | 9.64 |
| 0.155% | | 11.02 |

As can be seen from the table above, in Trial HK8Y19H–N, sodium oleate enhanced green color retention associated with 20 PPM of zinc as zinc stearate incrementally at all addition levels. At the highest level tested, 0.155% of total fatty acid salt, the "-a" value was 11, approaching the values seen when pea puree was fortified with 80 PPM of zinc as zinc stearate in previous examples.

The actual greenness as measured by "-a" values were lower in this example than those seen in previous examples. Two factors may account for this, different lots of peas and imprecise weighing of the 0.4 grams or 0.5 grams of zinc stearate required for each trial. Either or both of these may have contributed to the difference.

Four of the treatment groups were replicated in all of the three trials. The "-a" values for these groups were analyzed statistically using two-tailed, paired Student's t test. The results are shown in Table 15.

TABLE 15

| | no added zinc no sodium oleate added | 20 PPM zinc from 0.02% zinc stearate | | |
|---|---|---|---|---|
| | | no sodium oleate added | 0.02% sodium oleate added | 0.06% sodium oleate added |
| trail | 0.00% | total fatty acid salt level | | |
| | | 0.02% | 0.04% | 0.08% |
| 8Y08 | 2.65 | 4.62 | 5.93 | 7.31 |
| 8Y14 | 2.20 | 4.48 | 5.80 | 8.22 |
| 8Y19 | 1.94 | 4.14 | 4.61 | 6.41 |
| mean | 2.26 | 4.41 | 5.44 | 7.31 |
| std. deviation | 0.36 | 0.25 | 0.73 | 0.91 |
| differences* | a | b | b | c |

*different letters indicate that the means differ significantly at $P < 0.05$.

As seen in Table 15, zinc stearate at a concentration of 20 P.P.M. significantly increases the green color of the pea puree as measured by "-a" values. Furthermore, the addition of sodium oleate at a concentration of 0.06% produces a further significant increase in the green color. Thus, zinc stearate alone at a low concentration of 20 P.P.M. produces a detectable increase in greening and this effect is enhanced when the zinc stearate is combined with sodium oleate. The low levels of zinc stearate that are effective are important in food preparations where the zinc concentration needs to be kept below 75 P.P.M. and it is particularly relevant to a baby food preparation where the re-greening effect appears at a concentration of 20 P.P.M. which is in the nutritional range of zinc for infants. Thus added enhancers which can increase the re-greening effect of 20 P.P.M. are desirable for use in a baby food preparation.

EXAMPLE 6

This example evaluated fatty acid salts other than sodium oleate as enhancing agents in a green pea puree preparation.

In this study the zinc level used was 40 P.P.M. because level of zinc produces sufficient greening to enable detection of enhancement or inhibition for test substances.

Six master batches were produced with the same lot of thawed frozen peas. The blank master batch was made by blending 399.8 grams of peas and sufficient water to achieve a batch weight of 599.8 grams of puree.

A zinc stearate master batch containing 80 PPM zinc was made by blending 583.5 grams of peas, 0.7 grams of zinc stearate and sufficient water to achieve a batch weight of 874.9 grams of puree.

A sodium oleate master batch containing 0.08% sodium oleate was made by blending 250.0 grams of peas, 0.3 grams of sodium oleate and sufficient water to achieve a batch weight of 375.2 grams of puree.

A sodium stearate master batch containing 0.08% sodium stearate was made by blending 250.4 grams of peas, 0.3 grams of sodium stearate and sufficient water to achieve a batch weight of 376.0 grams of puree.

A calcium stearate master batch containing 0.08% calcium stearate was made by blending 249.9 grams of peas, 0.3 grams of calcium stearate and sufficient water to achieve a batch weight of 375.0 grams of puree.

A magnesium stearate master batch containing 0.08% magnesium stearate was made by blending 250.2 grams of peas, 0.3 grams of magnesium stearate and sufficient water to achieve a batch weight of 376.1 grams of puree.

A monoglyceride master batch containing 0.2% monoglyceride was made by blending 266.7 grams of peas, 0.8 grams of monoglyceride and sufficient water to achieve a batch weight of 399.4 grams of puree. The monoglyceride used was glyceryl monostearate (Myverol 18–07, Eastman Chemical Co.).

The master batch purees were blended to make samples HK8Z21A through HK8Z21G with the zinc and total fatty acid salt levels indicated in the table below. An equal amount, approximately 150 grams, of each of samples HK8Z21A through HK8Z21G was filled into a mason jar and heated in a microwave for 65 seconds to achieve an internal temperature between 77° C. and 82° C. to remove excessive air. All were retorted together for 60 minutes in a Presto home pressure cooker. All samples were submitted for Hunterlab Colormeter readings. The results are summarized in Tables 16 and 17 below.

TABLE 16

| Pea Sample | Zinc PPM | Fatty acid salt % | stearate salt | pH | Hunterlab Colormeter readings L | -a | b |
|---|---|---|---|---|---|---|---|
| HK8Z21A | 0 | 0.00% | None | 6.10 | 41.70 | 1.81 | 22.30 |
| HK8Z21B | 40 | 0.04% | Zinc | 6.01 | 39.56 | 5.38 | 20.82 |
| HK8Z21C | 40 | 0.08% | +sodium* | 6.10 | 40.62 | 9.15 | 21.31 |
| HK8Z21D | 40 | 0.08% | +sodium | 6.12 | 40.30 | 8.59 | 21.52 |
| HK8Z21E | 40 | 0.08% | +calcium | 6.11 | 39.58 | 8.22 | 21.25 |
| HK8Z21F | 40 | 0.08% | +magnesium | 6.11 | 39.03 | 7.71 | 20.76 |
| HK8Z21G | 40 | 0.04% | none (0.1% glyceryl monostearate) | 6.05 | 40.08 | 5.89 | 21.50 |

*sodium oleate added

TABLE 17

| additions | Hunterlab "-a" values |
|---|---|
| none | 1.81 |
| 0.04% zinc stearate (zinc, 40 PPM) | 5.38 |
| 0.04% zinc stearate + 0.04% sodium oleate | 9.15 |
| 0.04% zinc stearate + 0.04% sodium stearate | 8.59 |
| 0.04% zinc stearate + 0.04% calcium stearate | 8.22 |
| 0.04% zinc stearate + 0.04% magnesium stearate | 7.71 |
| 0.04% zinc stearate + 0.1% monoglyceride | 5.89 |

As seen in Tables 16 and 17, all the fatty acid salts enhanced the re-greening effect of zinc stearate. Sodium oleate was slightly more effective than sodium stearate. The order of effectiveness of the three stearate salts was sodium>calcium>magnesium.

Adding 0.1% monoglyceride, at a level 2.5-times greater than the non-zinc stearates, possibly had a very slight positive effect. This indicates that the fatty acid salt effect is not purely the result of adding some lipid material.

EXAMPLE 7

This example confirms the observation that calcium stearate enhanced the effect of zinc stearate on the green color in a retorted pea puree.

Four master batches were produced with the same lot of thawed frozen peas. A blank master batch was made by blending 364.6 grams of peas and sufficient water to achieve a batch weight of 547.0 grams of puree. A zinc stearate master batch containing 80 PPM zinc was made by blending 499.9 grams of peas, 0.6 grams of zinc stearate and sufficient water to achieve a batch weight of 751.9 grams of puree. A sodium oleate master batch containing 0.16% sodium oleate was made by blending 249.9 grams of peas, 0.6 grams of sodium oleate and sufficient water to achieve a batch weight of 375.3 grams of puree. A calcium stearate master batch containing 0.16% calcium stearate was made by blending 249.8 grams of peas, 0.6 grams of calcium stearate and sufficient water to achieve a batch weight of 375.5 grams of puree.

The four master batch purees were blended to make samples HK8Z01A through HK8Z01G with the zinc and total fatty acid salt levels indicated in the table below. An equal amount, approximately 150 grams, of each of samples HK8Z01A through HK8Z01G was filled into a mason jar and heated in a microwave for 65 seconds to achieve an internal temperature greater than 80° C. to remove excessive air. All were retorted together for 60 minutes in a Presto home pressure cooker. All samples were submitted for Hunterlab Colormeter readings. The results are summarized in Tables 18 and 19 below.

TABLE 18

| Pea Sample | Zinc PPM | Fatty acid salt % | Metal | PH | Hunterlab Colormeter readings L | -a | b |
|---|---|---|---|---|---|---|---|
| HK8Z01A | 0 | 0.00% | None | 5.98 | 39.97 | 1.65 | 20.42 |
| HK8Z01B | 40 | 0.04% | (zinc) | 5.99 | 40.46 | 5.64 | 21.11 |
| HK8Z01C | 40 | 0.08% | Sodium | 6.03 | 40.92 | 9.05 | 26.66 |
| HK8Z01D | 40 | 0.12% | Sodium | 6.06 | 39.63 | 9.84 | 20.77 |
| HK8Z01E | 40 | 0.08% | Calcium | 6.01 | 39.63 | 7.41 | 20.74 |
| HK8Z01F | 40 | 0.12% | Calcium | 6.03 | 39.67 | 8.80 | 20.80 |
| HK8Z01G | 40 | 0.04% | (zinc) | 5.99 | 40.07 | 5.70 | 20.99 |

TABLE 19

| additions | Hunterlab "-a" values |
|---|---|
| none | 1.65 |
| 0.04% zinc stearate (zinc, 40 PPM) | 5.64 |
| 0.04% zinc stearate (zinc, 40 PPM) | 5.70 |
| 0.04% zinc stearate + 0.04% sodium stearate | 9.05 |
| 0.04% zinc stearate + 0.04% calcium stearate | 7.41 |
| 0.04% zinc stearate + 0.08% sodium stearate | 9.84 |
| 0.04% zinc stearate + 0.08% calcium stearate | 8.80 |

As shown in the Tables 18 and 19, 40 PPM of zinc, i.e. 0.04% total fatty acid salt, zinc stearate enhanced green color retention in the retorted pea puree. The duplicate samples had very similar "-a" values. Doubling the fatty acid salt level to 0.08% total fatty acid by adding sodium oleate increased the enhancing effect. Further addition of sodium oleate produced an additional increase in the "-a" value but not nearly as much as the first addition.

Increasing the fatty acid salt level by adding calcium stearate also enhanced the zinc stearate effect, although not as effectively as sodium oleate. The enhancing effect of calcium stearate is surprising because the literature suggests that calcium salts have either no effect or an inhibitory effect on zinc re-greening of green vegetables.

EXAMPLE 8

This example shows that inorganic calcium salts do not enhance the re-greening effect of zinc stearate in a green pea puree, but instead have a slight inhibitory effect.

Pea puree was found to be of satisfactory consistency when made with 2 parts of frozen peas thawed in a microwave and 1 part of water or other solution. This was used to form master batch purees which could then be blended to prepare the individual mixtures testes. Three master batch purees, a blank master batch, a zinc master batch and a calcium master batch, were made as follows. The blank master batch was made by blending 600.1 grams of peas and 300.0 grams of water. The zinc master batch containing 200 PPM of zinc was made by blending 333.3 grams of peas, 1.0 gram of zinc stearate and sufficient water to total 500.6 grams. The calcium master batch containing 3000 PPM of calcium was made by blending 333.0 grams of peas, 3.9 grams of tricalcium phosphate and sufficient water to total 500.4 grams.

The three master batch purees were mixed and blended to produce samples HK8013A through HK8013G. Each sample was filled into a mason jar; the samples were retorted together for 60 minutes in a Presto home pressure cooker and then submitted for pH and Hunterlab Colormeter readings.

Adding zinc yielded a more green color, but the increase in "greenness" (i.e., the "-a" value) with pea puree was considerably less than that produced when the same amount of zinc was added to green bean puree. Adding tricalcium phosphate reduced pH slightly. A more acidic pH is known to inhibit the reaction of pheophytin with metals. The samples with added tricalcium phosphate had slightly less "greenness" than the samples with no added calcium. This decrease in the "-a" value was directionally consistent with the tricalcium phosphate addition level. Hunterlab Colormeter "L" and "b" values were similar for all samples.

The pH values and Hunterlab Colormeter readings for this experiment are given shown in Tables 20 and 21.

TABLE 20

| Pea puree Sample | Zinc PPM | Calcium PPM | Hunterlab Colormeter readings | | |
|---|---|---|---|---|---|
| | | | PH | L | -a | b |
| HK8013A | 0 | 0 | 6.16 | 40.42 | 2.20 | 21.22 |
| HK8013B | 20 | 0 | 6.11 | 40.98 | 3.24 | 21.72 |
| HK8013C | 40 | 0 | 6.04 | 40.89 | 6.30 | 21.84 |
| HK8013D | 20 | 600 | 6.09 | 42.11 | 3.13 | 22.22 |
| HK8013E | 40 | 600 | 6.00 | 40.30 | 5.37 | 21.18 |
| HK8013F | 20 | 2400 | 6.08 | 42.86 | 3.10 | 22.11 |
| HK8013G | 40 | 2400 | 6.03 | 42.22 | 5.24 | 21.83 |

TABLE 21

| additions | Hunterlab "-a" values |
|---|---|
| none | 2.20 |
| 0.02% zinc stearate (zinc, 20 PPM) | 3.24 |
| 0.02% zinc stearate + 600 PPM calcium | 3.13 |
| 0.02% zinc stearate + 2400 PPM calcium | 3.10 |
| 0.04% zinc stearate (zinc, 40 PPM) | 6.30 |
| 0.04% zinc stearate + 600 PPM calcium | 5.37 |
| 0.04% zinc stearate + 2400 PPM calcium | 5.24 |

As can be seen in Tables 20 and 21 above, the samples with added tricalcium phosphate had slightly less "greenness" than the samples with no added calcium. This decrease in the "-a" value was directionally consistent with the tricalcium phosphate addition level. Thus inorganic calcium salts produce no enhancement of the re-greening effect of zinc stearate, but instead produce a slight inhibition of the effect.

EXAMPLE 9

This example compared the effects of fatty acids and salts of fatty acids in enhancing the re-greening effect of zinc stearate-induced in retorted pea puree.

This experiment was performed at a zinc level of 40 P.P.M., which is equivalent to 0.04% zinc stearate. This zinc level gave a very strong increase in the green color of pea puree so that both inhibitory and enhancing effects on re-greening can be detected.

The substances tested were sodium oleate, sodium stearate, oleic acid, stearic acid, and palmitic acid.

The reagents used were as follows:

Zinc Stearate, USP. Product code: ZX0102-1; Lot No. 3290; Chemical Formula: $Zn(C18H35O2)/Zn(C16H31O2)$; distributed by EM Science, a Division of EM Industries, Inc., 480 Democrat Road Gibbstown, N.J. 08027, an Associate of E. Merck, Darmstadt, Germany.

Stearic Acid, Sodium Salt, powder. Product Code SX0970-3. Formula Weight 306.47. Lot 31210634; distributed by EM Science, a Division of EM Industries, Inc., 480 Democrat Road Gibbstown, N.J. 08027, an Associate of E. Merck, Darmstadt, Germany.

Sodium Oleate, powder. Formula Weight 304.45; Lot J44743; manufactured by J. T. Baker, Phillipsburg, N.J., 08865.

Oleic Acid. Purity 90.9%. Lot No. 45-63A; distributed by Chem Service, Box 3108, West Chester, Pa. 19381.

Stearic Acid. Purity 98.0%. Lot No. 41-119B; distributed by Chem Service, Box 3108, West Chester, Pa. 19381.

Palmitic Acid, Sigma Grade, approx. 99%. Lot no. 22H0900; distributed by Sigma Chemical Company, P.O. Box 14508, St. Louis, Mo. 63178.

Seven master batches were produced with five pounds of thawed frozen peas blended from two lots from the same distributor. The blank master batch was made by blending 300.7 grams of peas and sufficient water to achieve a batch weight of 451.4 grams of puree.

A zinc stearate master batch containing 80 PPM zinc was made by blending 583.9 grams of peas, 0.7 grams of zinc stearate and sufficient water to achieve a batch weight of 875.5 grams of puree.

A sodium oleate master batch containing 0.08% sodium oleate was made by blending 250.2 grams of peas, 0.3 grams of sodium oleate and sufficient water to achieve a batch weight of 375.9 grams of puree.

A sodium stearate master batch containing 0.08% sodium stearate was made by blending 250.0 grams of peas, 0.3 grams of sodium stearate and sufficient water to achieve a batch weight of 375.4 grams of puree.

An oleic acid master batch containing 0.08% oleic acid was made by blending 250.1 grams of peas, 0.3 grams of oleic acid and sufficient water to achieve a batch weight of 375.4 grams of puree.

A stearic acid master batch containing 0.08% stearic acid was made by blending 250.0 grams of peas, 0.3 grams of stearic acid and sufficient water to achieve a batch weight of 378.5 grams of puree.

A palmitic acid master batch containing 0.08% palmitic acid was made by blending 250.7 grams of peas, 0.3 grams of palmitic acid and sufficient water to achieve a batch weight of 376.1 grams of puree.

Equal 100-gram amounts of the appropriate master batch purees were blended together to make samples HK9117B through HK9117G with the stated zinc and additive levels. An equal amount, approximately 150 grams, of each of samples HK9117A through HK9117G was filled into a mason jar and heated in a microwave to 81° C. to 83° C. to remove excessive air. All samples were retorted together for 60 minutes in a Presto home pressure cooker and then submitted for pH and color measurement. The results are summarized in Tables 22 and 23.

TABLE 22

| Pea Sample | Zinc PPM | Additive (at 0.04%) | PH | Hunterlab Colormeter readings | | |
|---|---|---|---|---|---|---|
| | | | | L | -a | b |
| HK9117A | 0 | none | 6.27 | 43.54 | 3.02 | 22.61 |
| HK9117B | 40* | none | 6.23 | 43.32 | 6.55 | 22.79 |
| HK9117C | 40* | sodium oleate | 6.29 | 42.77 | 9.95 | 22.47 |
| HK9117D | 40* | sodium stearate | 6.31 | 42.93 | 9.14 | 22.60 |
| HK9117E | 40* | oleic acid | 6.23 | 43.34 | 10.94 | 22.94 |
| HK9117F | 40* | stearic acid | 6.17 | 43.94 | 10.07 | 23.17 |
| HK9117G | 40* | palmitic acid | 6.21 | 43.59 | 9.79 | 22.98 |

*0.04% zinc stearate

TABLE 23

| additions | Hunterlab "-a" values |
|---|---|
| none | 3.02 |
| 0.04% zinc stearate (zinc, 40 PPM) | 6.55 |
| 0.04% zinc stearate + 0.04% sodium oleate | 9.95 |
| 0.04% zinc stearate + 0.04% oleic acid | 10.94 |
| 0.04% zinc stearate + 0.04% sodium stearate | 9.14 |
| 0.04% zinc stearate + 0.04% stearic acid | 10.07 |
| 0.04% zinc stearate + 0.04% palmitic acid | 9.79 |

Surprisingly, the zinc stearate samples to which fatty acids had been added were greener than the samples to which fatty acid sodium salts had been added. It is possible that this results from the fatty acid moiety being predominantly responsible for the re-greening effect so that the fatty acids, which would contain a greater amount of fatty acid moiety than the sodium salt of a fatty acid, produce a greater re-greening effect.

From this example, it can be concluded that a fatty acid can be used to enhance the zinc stearate effect without the need for a trailing cation. Thus, sodium would not need to be added to the food composition which could avoid any possible labeling requirements. Thus, the use of fatty acids might be particularly desirable for use in baby food compositions and other purees.

EXAMPLE 10

This example illustrates the statistical analysis of the re-greening effect of identical concentration groups in several of the trials as illustrated above in Examples 6–9.

The treatment groups pooled for this analysis were (1) blank with no zinc stearate and sodium oleate added, (2) 0.04% zinc stearate and no sodium oleate added, (3) 0.04% zinc stearate and 0.04% sodium oleate added and (4) 0.04% zinc stearate and 0.04% calcium stearate added. Two treatments were replicated in four of these trials and another was replicated three times. Their Hunterlab "-a" values were analyzed statistically by two-tailed paired Student's t-test. The results are shown in Table 24.

TABLE 24

| | no added zinc | 40 PPM zinc from 0.04% zinc stearate | | | |
|---|---|---|---|---|---|
| trial | no sodium oleate added | no other fatty acid salt added | +0.04% sodium oleate | +0.04% sodium stearate | +0.04% calcium stearate |
| | total fatty acid salt level | | | | |
| | 0.00% | 0.04% | 0.08% | 0.08% | 0.08% |
| 8013 | 2.20 | 6.30 | | | |
| 8Z01 | 1.65 | 5.67 | 9.05 | | 7.41 |
| 8Z21 | 1.81 | 5.38 | 9.15 | 8.59 | 8.22 |
| 9117 | 3.02 | 6.55 | 9.95 | 9.14 | |
| mean | 2.17 | 5.98 | 9.38 | 8.87 | 7.82 |
| std. deviation | 0.61 | 0.54 | 0.49 | 0.39 | 0.57 |
| number | 4 | 4 | 3 | 2 | 2 |
| difference* | a | b | c | | |

*different letters indicate that the means differed significantly at P < 0.002.

Thus, zinc stearate (0.04%) significantly increased the greenness as measured by "-a" values and this effect was enhanced by sodium oleate (0.04%). The "-a" values for both groups differed from control in a highly statistically significant manner. The greenness produced by zinc stearate (0.04%) was also increased by sodium stearate (0.04%) and by calcium oleate (0.04%) although these increases did not achieve statistical significance because there were only two values in each of two groups.

EXAMPLE 11

This example illustrates the production of green color by zinc stearate in a previously retorted mixture containing dried, green split peas.

This series of experiments identified as HK9110, used Campbell's Condensed Soup variety of Split Peas as a matrix for testing the re-greening effect on retorted and dried green split peas. "Cooked split peas" is the first listed ingredient; green split peas are displayed on the principal display panel.

The zinc stearate level was designed to give a realistic label claim for zinc in a serving of prepared soup (diluted one-to-one with water): of about 30% Daily Value (DV) for adults.

Three cans (each 11.5 oz. or 326 grams labeled contents) of Campbell's Condensed Soup variety Split Peas (coded "OCT00 10138" "EST 4K 46FL 1856") were heated in boiling water for thirty minutes to make more fluid. The temperature of the soup reached 75° C. to 80° C., but the soup had no free fluid even at this temperature, so approximately 480 to 500 grams of water were added to the 976.8 grams of condensed soup removed from the cans and the mixture was heated to approximately 75° C. in a double boiler.

The liquid portion was separated from the particulate fraction with a kitchen strainer. The particulates weighed 732.7 grams; the liquid portion weighed 685.5 grams; a small portion—at least 40 grams—remained in the double boiler container.

Approximately fifty grams (ranging from 49.1 to 50.7 grams) of particulate material was weighed into six half-pint mason jars. The liquid portion was blended with a whisk to achieve uniformity. To three of the mason jars, approximately 75 grams (ranging from 72.3 to 74.8 grams) of blended liquid was added to cover the particulate material. These jars were labeled HK9110A1, HK9110A2 and HK9110A3.

Zinc stearate, 0.4 grams, was added to the remaining liquid fraction (weighing approximately 435 to 440 grams) and blended with an electric hand mixer to achieve uniform dispersion of the insoluble zinc stearate. Approximately 75 grams (range 72.8 to 75.3) of this blended liquid containing zinc stearate was added to the other three jars, which were labeled HK9110B1, HK9110B2 and HK9110B3.

All the jars were retorted together for 53 minutes in a Presto home pressure cooker. Samples HK9110A1 and HK9110B3 were submitted to the laboratory for pH, Hunterlab Colormeter readings and zinc analysis. The other samples were retained for future use.

The HK9110B samples were noticeably more brightly green upon removal from the pressure cooker. The pH values and Hunterlab Colormeter "-a" readings are give below in Table 25.

TABLE 25

| Pea Soup Sample | Zinc PPM | pH | Hunterlab Colormeter readings | | |
|---|---|---|---|---|---|
| | | | L | -a | b |
| HK9110A1 | 5.0 | 6.17 | 51.80 | 0.98 | 23.23 |
| HK9110B3 | 50.0 | 6.05 | 50.67 | 3.25 | 22.32 |

As seen in the table the "-a" values confirmed the immediate visual observation in that the HK9110B3 sample had a higher "-a" value than the HK9110A1 sample.

The analytical results indicate that 45 PPM of zinc were added to the HK9110B soup samples. Theoretically by calculation about 55 PPM should have been added.

The significance of this experiment is that retorted puree of dried split peas, an olive green material, can be re-greened with zinc stearate.

EXAMPLE 12

This example illustrates the effects of fatty acids and stearates on the re-greening produced by the water-soluble zinc salt, zinc acetate, in a green pea puree.

This study identified as Series HK9310 used a pea puree, zinc stearate, zinc acetate and various stearates. A zinc level of 40 P.P.M., which is equivalent to 0.04% zinc stearate, was used. When added as zinc stearate, this zinc level gives a good increase in the green color of pea puree. Potential enhancing agents tested were palmitic acid, stearic acid, sodium stearate and calcium stearate. Two controls were tested, one containing no additives and a second contained zinc stearate without an enhancing agent.

All samples were made with 0.5 kg of thawed frozen peas which were pureed with addition of water up to a total of 0.75 kg. The test samples with 40 P.P.M zinc added as zinc acetate contained 25 grams of a solution made by diluting 4.0 grams of zinc acetate dihydrate to 993 grams with water, calculated to contain 1.2 milligrams of zinc per gram of solution. The fatty acids and stearates when present were added in an amount of 0.3 grams.

An equal amount, approximately 150 grams, of each of the samples was filled into a mason jar and heated in a microwave to achieve an internal temperature between 74° C. and 81° C. to remove excessive air. The samples were retorted together in sets of seven samples for 60 minutes in a Presto home pressure cooker. All samples were submitted for Hunterlab Colormeter readings and pH. The results measured as -"a" values are shown in Table 26.

TABLE 26

| Treatment | Replicate No. 1 | Replicate No. 2 | Mean | Difference from control |
|---|---|---|---|---|
| | greenness ("-a" values) | | | |
| Control | 3.25 | 3.14 | 3.20 | (0.00) |
| zinc stearate (40 PPM) | 6.07 | 5.97 | 6.02 | 2.82 |
| zinc acetate (40 PPM) | 4.19 | 3.81 | 4.00 | 0.80 |
| zinc acetate + palmitic acid | 4.68 | 4.69 | 4.68 | 1.48 |
| zinc acetate + stearic acid | 5.25 | 4.72 | 4.98 | 1.78 |
| zinc acetate + sodium stearate | 4.91 | 5.27 | 5.09 | 1.89 |
| zinc acetate + calcium stearate | 5.11 | 5.38 | 5.24 | 2.04 |

As seen in Table 26, adding 40 PPM of zinc as the soluble zinc acetate resulted in a much smaller re-greening effect on pea puree than that produced by adding 40 PPM of zinc as the insoluble zinc stearate salt. Nevertheless, adding insoluble fatty acids or stearates as enhancing agents further increased the re-greening effect of zinc provided as the soluble zinc acetate.

EXAMPLE 13

This example illustrates a pilot plant scale up of zinc stearate and calcium stearate addition to Stage 1 Tender Sweet Peas.

In this experiment, samples were obtained for stability testing (i.e., to assure that the re-greening phenomenon created by zinc stearate is permanent). The experiments were also designed to generate standard error statistics. The experiment was also intended to demonstrate the reproducibility and significance of the re-greening effect at a pilot plant location.

The two products to be made were (1) a control with no additives and (2) an embodiment of re-greened vegetable product having a zinc level of 20 PPM, equivalent to 0.02% zinc stearate, and additionally 0.16% calcium stearate, to give a total fatty acid salt level of 0.18%. The zinc level of the re-greened embodiment is highly desirable, as it represents 40% to 45% of the Daily Value (DV) for zinc in a 4-ounce serving. This calcium stearate level delivers 2% of the Daily Value of calcium in a 4-ounce serving. In actuality, however, the amounts of each agent in the experiment were only 78% of that intended due to the added water required to puree the peas.

Pilot Plant Sample PP6048.

Step One—Pilot Plant Puree Production.

One hundred pounds of frozen peas were placed in a Fitzpatrick Comminutor, Model No. D, at slow speed and a temperature of 200° F. to 205° F. (205° F. target). Approximately 23 lb. of water were added through steam injection, resulting in a total puree weight of 122.7 lb. The spinning knives in the Comminutor and the injected steam comminute the peas into a puree that passes through a 3/16" or 1/4" screen. The puree was then passed twice through a Stephan Microcutter, Model No. MC-12, equipped with a 0.05–0.10 mm ring. The resulting puree was transferred to a stock pot.

Step Two—Pilot Plant Manufacturing Procedure for the Product. Technical personnel sampled the aforementioned pea puree in the stock pot and determined that it had a total solids content of 16.56% and an FMC Consistometer reading of 39 at 143° F. Technical personnel determined the quantity of additional water required to adjust the consistency to 13±1 FMC Consistometer units at 180° F. Technical personnel then placed 100.0 lb. of the aforementioned pea puree and 6.0 lb. of batch water in a Koven Kettle that is capable of holding 300 lb. of product. The puree was passed twice through a Stephan Microcutter, Model No. MC-12, equipped with a 0.05–0.10 mm ring and strained through a 0.050" screen.

The product was then placed in glass jars and further processed in a conventional fashion and as further required by 21 C.F.R. §113 et seq. "Thermally Processed Low-Acid Foods Packaged in Hermetically Sealed Containers," which is incorporated herein by reference.

Pilot Plant Sample PP6049.

Step One—Pilot Plant Puree Production.

Zinc stearate, 9.08 grams (0.02 lb.), and calcium stearate, 72.64 grams (0.16 lb.), were sprinkled onto 100.0 lb. of frozen peas as they were being placed in a Fitzpatrick Comminutor, Model No. D, running at slow speed and a temperature of 200° F. to 205° F. (205° F. target). Approximately 20 lb. of water were added through steam injection, resulting in a total puree weight of 120.0 lb. The spinning knives in the Comminutor and the injected steam comminute the peas into a puree that passes through a 3/16" or 1/4" screen. The puree was then passed twice through a Stephan Microcutter, Model No. MC-12, equipped with a 0.05–0.10 mm ring. The resulting puree was transferred to a stock pot.

Step Two—Pilot Plant Manufacturing Procedure for the Product. Technical personnel sampled the aforementioned pea puree in the stock pot and determined that it had a total solids content of 16.62% and an FMC Consistometer reading of 40 at 155° F. Technical personnel determined the quantity of additional water required to adjust the consistency to 13±1 FMC Consistometer units at 180° F. Technical personnel then placed 100.0 lb. of the aforementioned pea puree and 6.75 lb. of batch water in a Koven Kettle that is capable of holding 300 lb. of product. The puree was passed twice through a Stephan Microcutter, Model No. MC-12, equipped with a 0.05–0.10 mm ring and strained through a 0.050" screen.

The product was then placed in glass jars and further processed in a conventional fashion and as further required by 21 C.F.R. § 113 et seq. "Thermally Processed Low-Acid Foods Packaged in Hermetically Sealed Containers," which is incorporated herein by reference.

Samples of each product were sent to the laboratory for pH, Hunterlab Colormeter readings, zinc and calcium analysis and extended stability testing. The results are summarized in Table 27.

TABLE 27

| Pea Sample | Fatty acid salt level | Zinc PPM | Calcium mg/100 g | PH | Hunterlab Colormeter readings | | |
|---|---|---|---|---|---|---|---|
| | | | | | L | –a | b |
| PP6048 | 0.00% | 5.5 | 32.3 | 6.27 | 46.02 | 3.72 | 23.26 |
| PP6049 | 0.14% | 20.0 | 39.5 | 6.33 | 46.61 | 6.11 | 23.35 |

The unfortified sample in this experiment was slightly greener than in home kitchen trials, presumably because the retorting conditions were milder. The re-greening effect with zinc stearate plus calcium stearate was less than expected given the results of sample HK8Y14N in Example 1 (20 PPM from zinc stearate plus sodium oleate to a total fatty acid salt level of 0.155%: '-a' value of 11.02). However, Example 6 established that calcium stearate was less enhancing than sodium oleate, which may be a partial explanation.

Also, the theoretical amount of added zinc in PP6049 was 15.6 PPM, which is consistent with the difference between the analytical values for PP6048 and PP6049 of 14.5 PPM (20.0 PPM less 5.5 PPM) rather than the intended 20 PPM. When zinc stearate is added to a food and a label claim for zinc is made, zinc then becomes a Class I nutrient within the meaning of 21 C.F.R. § 101.9(g)(3)(i), and must be present at a level at least equal to the claimed amount (21 C.F.R. § 101.9(g)(4)(i)). The analytical value for zinc in PP6049, 20 PPM or 2.26 mg per 4 ounces, probably would justify a label claim of only 40% of the Daily Reference Intake of 5 mg for infants per 4-ounce jar.

The analytical data for calcium indicate an addition level of about 7.2 mg/100 g, or 8.1 mg per 4 ounces. The estimated amount of calcium added as calcium stearate was 9.36 mg per 4 ounces. The Daily Reference Intake value for infants is 600 milligrams so this amount of added calcium is nutritionally insignificant.

Sufficient samples were produced to enable study of the stability of the color when samples were stored at room temperature for an extended time. The long-term Stability of Colormeter "-a" values for canned pea purees without and with added zinc stearate and calcium stearate are shown in Table 28 below.

TABLE 28

| | Hunterlab Colormeter "–a" value | | | |
|---|---|---|---|---|
| | 2-week | 4-week | 2-month | 3-month |
| PP6048 | 4.29 | 3.65 | 3.75 | 3.42 |
| no added | 3.81 | 3.68 | 3.79 | 3.17 |
| stearates | 3.97 | 3.80 | 3.89 | 3.25 |
| (no added | 4.19 | 3.75 | 3.59 | 3.46 |
| zinc) | 3.86 | 3.99 | 3.71 | 3.37 |
| mean | 4.02 | 3.77 | 3.75 | 3.33 |
| std dev | 0.21 | 0.13 | 0.11 | 0.12 |
| PP6049 | 5.81 | 6.84 | 6.78 | 5.82 |
| with added | 5.72 | 6.92 | 6.66 | 6.15 |
| stearates | 5.55 | 6.75 | 6.65 | 5.77 |
| (with added | 5.58 | 6.92 | 6.77 | 6.05 |
| zinc) | 6.54 | 6.84 | 6.78 | 6.18 |
| mean | 5.84 | 6.85 | 6.73 | 5.99 |
| std dev | 0.41 | 0.07 | 0.07 | 0.19 |
| grp compar | | | | |
| test | 0.00200% | 0.00000% | 0.00000% | 0.00000% |
| time | | 2 wk–4 wk | 2 wk–2 mo | 3 wk–3 mo |
| group | | PP6048 | PP6048 | PP6048 |
| ttest | | 5.42% | 72.76% | 0.021% |
| time | | 2 wk–4 wk | 2 wk–2 mo | 2 wk–3 mo |
| group | | PP6049 | PP6049 | PP6049 |
| ttest | | 0.057% | 0.130% | 46.33% |

As can be seen from the table, the pea puree containing zinc stearate and calcium stearate showed a significant increased greenness which was maintained over a period of 3 months. Furthermore, the greenness did not show the decrease during long term storage noted in the control.

EXAMPLE 14

This example illustrates a pilot plant scale up of zinc stearate and stearic acid addition to Stage 1 Tender Young Green Beans.

The products made in this example were a control with no zinc stearate or stearic acid and a preparation containing zinc at 20 P.P.M., equivalent to 0.02% zinc stearate, and additionally 0.08% stearic acid, to give a total fatty acid level of 0.10%.

Four batches of green bean puree were made in the following manner. One hundred pounds of frozen green beans were placed in a Fitzpatrick Comminutor, Model No. D, operating at slow speed and a temperature of 200° F. to 205° F. (205° F. target). The spinning knives in the Comminutor and the injected steam comminuted the green beans into a puree that passed through a 3/16" or 1/4" screen. The puree was then passed twice through a Stephan Microcutter, Model No. MC-12, equipped with a 0.05–0.10 mm ring. The resulting puree was transferred to a stock pot.

Pilot Plant Sample PP6089 was prepared as follows. Technical personnel placed 100 lb. of the aforementioned green bean puree in a Koven Kettle that is capable of holding 300 lb. of product. A sample was taken for pH measurement. The puree was maintained at a temperature of 180° F.

The product was then filled into glass jars, capped and further processed in a conventional fashion and as further required by 21 C.F.R. § 113 et seq. "Thermally Processed Low-Acid Foods Packaged in Hermetically Sealed Containers", which is incorporated herein by reference.

Pilot Plant Sample PP6090 was prepared as follows. A trituration of 20.0 grams of zinc stearate with 80.0 grams of stearic acid was made in the test kitchen. Given that zinc stearate contains 10% zinc, the trituration provided 2% zinc. Adding 50 grams of trituration to 100 lb. of green bean puree provided an additional 22 PPM of zinc, equal to 2.5 mg of zinc in 4 ounces of processed baby food.

Technical personnel placed 100 lb. of the aforementioned green bean puree in a swept-surface heat exchange kettle. A sample was taken for pH measurement. Fifty grams of the zinc stearate trituration in stearic acid was added to the green bean puree and the mixture blended for 15 minutes. The trituration did not blend well into the puree, forming tiny balls of white material, so the slurry was passed through a Stephan Microcutter, Model No. MC-12, equipped with a 0.05–0.10 mm ring and stirred. A sample was taken for pH measurement. The slurry was filled at a temperature of 175° F. into glass jars, capped and further processed in a conventional fashion and as further required by 21 C.F.R. § 113 et seq. "Thermally Processed Low-Acid Foods Packaged in Hermetically Sealed Containers", which is incorporated herein by reference.

Five samples of each product were sent to the laboratory for pH, Hunterlab Colormeter readings, and zinc and calcium analysis.

The pH readings for Pilot Plant Samples 6089 and 6090 are shown in Table 29 and the Hunterlab Colormeter readings from five samples of 6089 and 6090 are shown in Table 30. Table 31 summarizes the pH and mean Colormeter readings.

TABLE 29

|  | PP6090 control | PP6089 zinc stearate & stearic acid |
|---|---|---|
| unprocessed pH | 5.78 | 5.58 |
| processed pH | 5.23 | 5.26 |

TABLE 30

Pilot Plant Run of 3/30/99

|  | "L" | "-a" | "b" |
|---|---|---|---|
| PP6089 | 32.22 | 1.30 | 16.85 |
|  | 32.50 | 1.38 | 17.23 |
|  | 31.80 | 1.07 | 16.61 |
|  | 31.91 | 1.48 | 16.73 |
|  | 30.98 | 1.07 | 16.28 |
| mean | 31.88 | 1.26 | 16.74 |
| std dev | 0.57 | 0.18 | 0.35 |
| PP6090 | 32.21 | 9.93 | 16.61 |
|  | 32.29 | 9.66 | 16.74 |
|  | 31.45 | 9.11 | 16.22 |
|  | 31.35 | 8.22 | 15.93 |
|  | 32.77 | 10.10 | 17.13 |
| mean | 32.01 | 9.40 | 16.53 |
| std dev | 0.60 | 0.76 | 0.47 |
| two-tailed "t"-test |  |  |  |
| PP6089 vs PP6090 | 73.2% | 0.00000124% | 43.4% |

TABLE 31

| Sample | Zinc PPM | pH | L | -a | b | Taste score |
|---|---|---|---|---|---|---|
| PP6089 | — | 5.23 | 31.88 ± 0.57 | 1.26 ± 0.18 | 16.74 ± 0.35 | 4 |
| PP6090 | 20 | 5.26 | 32.01 + 0.60 | 9.40 + 0.76 | 16.53 + 0.47 | 6 |

The re-greening effect with zinc stearate plus stearic acid was visually spectacular, as confirmed by the "-a" values for PP6090 and PP6089 (P<0.0000001). Freshly made puree made of cooked but unretorted green beans had an "-a" value of 6.87. Thus, the presence of zinc stearate and stearic acid in the retorted green bean puree resulted a higher "a" value than that in the freshly made green bean puree.

The taste of the retorted green bean purees without and with zinc stearate and stearic acid was evaluated on a 9-point hedonic scale as follows.

| Score/rating | Std. Hedonic Scale |
|---|---|
| 9 | I like extremely |
| 8 | I like very much |
| 7 | I like moderately |
| 6 | I like slightly |
| 5 | I neither like nor dislike |
| 4 | I dislike slightly |
| 3 | I dislike moderately |
| 2 | I dislike very much |
| 1 | I dislike extremely |

Surprisingly, the presence of zinc stearate and stearic acid in sample PP6090 substantially improved the flavor of the composition compared to PP6089. The unpleasant and bitter aftertaste of retorted green bean puree was greatly diminished in PP6090.

All references cited in this specification are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A processed vegetable composition comprising a green vegetable treated with at least one zinc salt of a fatty acid and wherein the zinc salt of a fatty acid has a low water solubility and wherein the zinc salt of a fatty is present in an amount of 75 ppm or less producing a re-greening effect on the processed green vegetable.

2. The vegetable composition according to claim 1 wherein the zinc salt of a fatty acid is a zinc salt of a saturated fatty acid having at least 6 carbons and not more than 22 carbons.

3. The vegetable composition according to claim 2 wherein the zinc salt of a fatty acid is zinc stearate at a concentration of about 0.02% (w/w).

4. The vegetable composition according to claim 3 wherein the green vegetable is selected from the group consisting of green beans, peas, spinach, asparagus, brussels sprouts, broccoli, and okra.

5. The vegetable composition according to claim 1 further comprising an enhancing agent which is capable of increasing the re-greening effect of the at least one zinc salt of a fatty acid.

6. The vegetable composition according to claim 5 wherein the enhancing agent is a fatty acid, an alkali metal salt of a fatty acid or an alkaline earth metal salt of a fatty acid.

7. The vegetable composition according to claim 6 wherein the enhancing agent is oleic acid, palmitic acid, stearic acid, sodium stearate, calcium stearate, magnesium stearate or combinations thereof.

8. The vegetable composition according to claim 7 wherein the composition comprises calcium stearate at a concentration of about 0.04% (w/w) and zinc stearate at a concentration of about 0.02% (w/w).

9. The vegetable composition according to claim 1 prepared by a method comprising processing a green vegetable and adding the at least one zinc salt of a fatty acid.

10. The vegetable composition according to claim 1 in an acceptable baby food formulation.

11. A method for preparing a vegetable composition having an improved green color, the method comprising adding to a processed green vegetable at least one zinc salt of a fatty acid in a re-greening effective amount of 75 ppm (w/w) or less, wherein the zinc salt of a fatty acid has a low water solubility.

12. The method according to claim 11 wherein the at least one zinc salt of a fatty acid is a zinc salt of a saturated fatty acid having at least 6 carbons and not more than 22 carbons.

13. The method according to claim 12 wherein the at least one zinc salt of a fatty acid is zinc stearate at a concentration of about 0.02% (w/w).

14. The method according to claim 13 wherein the green vegetable is selected from the group consisting of green beans, peas, spinach, asparagus, brussels sprouts, broccoli, and okra.

15. The method according to claim 11 further comprising adding an enhancing agent which increases the re-greening effect of the at least one zinc salt of a fatty acid.

16. The method according to claim 15 wherein the enhancing agent is a fatty acid, an alkali metal salt of a fatty acid or an alkaline earth metal salt of a fatty acid.

17. The method according to claim 16 wherein the enhancing agent is oleic acid, palmitic acid, stearic acid, sodium stearate, calcium stearate, magnesium stearate or combinations thereof.

18. The method according to claim 17 wherein calcium stearate is added to the composition at a concentration of about 0.04% (w/w) and zinc stearate is added to the composition at a concentration of about 0.02% (w/w).

19. The method according to claim 18 wherein the green vegetable is selected from the group consisting of green beans, peas, spinach, asparagus, brussels sprouts, broccoli, and okra and wherein the method the method further comprises pureeing the green vegetable.

20. The method according to claim 19 wherein the composition is prepared in an acceptable baby food formulation.

* * * * *